United States Patent
Scholl et al.

(10) Patent No.: US 11,989,749 B2
(45) Date of Patent: May 21, 2024

(54) SYSTEMS AND METHODS FOR DETECTING AND SCORING DRIVER ACTIVITY

(71) Applicant: MASTERCARD INTERNATIONAL INCORPORATED, Purchase, NY (US)

(72) Inventors: Christopher T. Scholl, Saint Peters, MO (US); Regan E. Harmon, O'Fallon, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 162 days.

(21) Appl. No.: 16/122,644

(22) Filed: Sep. 5, 2018

(65) Prior Publication Data

US 2020/0074492 A1 Mar. 5, 2020

(51) Int. Cl.
*G06Q 30/0207* (2023.01)
*B60W 40/09* (2012.01)
(Continued)

(52) U.S. Cl.
CPC ......... *G06Q 30/0207* (2013.01); *B60W 40/09* (2013.01); *G06Q 10/06393* (2013.01);
(Continued)

(58) Field of Classification Search
CPC .............. B60W 40/09; G06K 9/00845; G06Q 10/06393; G06Q 30/0207; G06Q 40/08; G06Q 50/30; G07C 5/008
(Continued)

(56) References Cited

U.S. PATENT DOCUMENTS 7,071,842 B1 * 7/2006 Brady, Jr. ........... G06F 16/9537
340/991
8,510,200 B2 8/2013 Pearlman et al.
(Continued)

FOREIGN PATENT DOCUMENTS

KR 20170058161 A * 11/2015

OTHER PUBLICATIONS

RightTrack. Liberty Mutual, 2014, accessed at <https://www.libertymutual.com/righttrack> (Year: 2014).*
(Continued)

*Primary Examiner* — Ilana L Spar
*Assistant Examiner* — Melinda Gieringer
(74) *Attorney, Agent, or Firm* — Armstrong Teasdale LLP

(57) ABSTRACT

A driver scoring (DS) computing device for scoring driving activity for a driver in real-time is provided. The DS computing device includes at least one processor in communication with at least one memory, the at least one processor configured to: (i) receive sensor data about a driver in a vehicle; (ii) determine, from the sensor data, a driver activity including at least a duration for the activity; (iii) calculate a score for the determined activity, wherein the score depends on at least one of a type of activity and the duration of the activity; (iv) retrieve a driver profile associated with the driver from the at least one memory, the driver profile including at least one of user input preferences and a history of payment transactions; and (v) generate at least one merchant incentive based on the score and the driver profile.

20 Claims, 9 Drawing Sheets

(51) Int. Cl.
    *G06Q 10/0639* (2023.01)
    *G06Q 40/08* (2012.01)
    *G06Q 50/40* (2024.01)
    *G06V 20/59* (2022.01)
    *G07C 5/00* (2006.01)

(52) U.S. Cl.
    CPC ............. *G06Q 40/08* (2013.01); *G06Q 50/40* (2024.01); *G06V 20/597* (2022.01); *G07C 5/008* (2013.01)

(58) Field of Classification Search
    USPC ........................................................ 705/14.1
    See application file for complete search history.

(56) References Cited

U.S. PATENT DOCUMENTS

| | | | | |
|---|---|---|---|---|
| 8,924,240 | B2* | 12/2014 | Depura | G06Q 40/08 701/538 |
| 9,055,407 | B1* | 6/2015 | Riemer | H04M 1/72454 |
| 9,141,582 | B1* | 9/2015 | Brinkmann | G07C 5/0808 |
| 9,596,357 | B1 | 3/2017 | Ruperto | |
| 9,672,568 | B1* | 6/2017 | Slusar | G08G 1/0112 |
| 9,754,425 | B1 | 9/2017 | Iqbal et al. | |
| 9,820,108 | B1* | 11/2017 | Inciong | H04M 1/72566 |
| 9,858,832 | B1* | 1/2018 | Hsu-Hoffman | G09B 19/167 |
| 10,026,243 | B1 | 7/2018 | Hsu-Hoffman et al. | |
| 10,430,883 | B1 | 10/2019 | Bischoff et al. | |
| 10,445,758 | B1* | 10/2019 | Bryer | G06Q 40/08 |
| 10,565,593 | B1* | 2/2020 | Aabram | G07F 17/0057 |
| 10,699,289 | B1* | 6/2020 | Dalton | H04W 4/023 |
| 11,151,888 | B1 | 10/2021 | Fillinger | |
| 2006/0195394 | A1 | 8/2006 | Jung | |
| 2007/0156530 | A1* | 7/2007 | Schmitt | G06Q 30/0215 705/14.17 |
| 2010/0030582 | A1* | 2/2010 | Rippel | G06Q 40/08 707/E17.001 |
| 2010/0106585 | A1* | 4/2010 | Etheredge | G06Q 20/40 705/14.17 |
| 2010/0210254 | A1* | 8/2010 | Kelly | H04K 3/415 455/418 |
| 2010/0280956 | A1* | 11/2010 | Chutorash | G07F 13/025 705/64 |
| 2011/0009107 | A1* | 1/2011 | Guba | H04W 4/027 455/418 |
| 2011/0059731 | A1 | 3/2011 | Schivley | |
| 2011/0093161 | A1* | 4/2011 | Zhou | B60W 50/08 701/31.4 |
| 2011/0196571 | A1* | 8/2011 | Foladare | G08G 1/207 701/31.4 |
| 2011/0246284 | A1* | 10/2011 | Chaikin | G06Q 30/0207 705/14.1 |
| 2012/0071151 | A1* | 3/2012 | Abramson | H04L 67/12 455/418 |
| 2012/0089442 | A1 | 4/2012 | Olsson et al. | |
| 2012/0185282 | A1 | 7/2012 | Gore et al. | |
| 2013/0006675 | A1 | 1/2013 | Bowne | |
| 2013/0046510 | A1 | 2/2013 | Bowne | |
| 2013/0164715 | A1 | 6/2013 | Hunt et al. | |
| 2013/0232029 | A1* | 9/2013 | Rovik | G07C 5/008 705/26.8 |
| 2014/0081404 | A1 | 3/2014 | Jacofsky et al. | |
| 2014/0095305 | A1* | 4/2014 | Armitage | G06Q 30/0251 705/14.49 |
| 2014/0108198 | A1* | 4/2014 | Jariyasunant | G06Q 40/08 705/26.35 |
| 2014/0113619 | A1* | 4/2014 | Tibbitts | G06Q 40/08 |
| 2014/0195272 | A1* | 7/2014 | Sadiq | G06Q 40/08 705/4 |
| 2014/0226010 | A1 | 8/2014 | Molin | H04N 7/01 340/576 |
| 2014/0322676 | A1* | 10/2014 | Raman | G09B 19/167 434/65 |
| 2015/0019873 | A1 | 1/2015 | Hagemann | |
| 2015/0081404 | A1 | 3/2015 | Basir | |
| 2015/0195399 | A1* | 7/2015 | Way | H04M 1/72463 455/26.1 |
| 2015/0213555 | A1 | 7/2015 | Barfield, Jr. et al. | |
| 2015/0220958 | A1* | 8/2015 | Tietzen | G06Q 40/08 705/26.35 |
| 2015/0294422 | A1* | 10/2015 | Carver | G06Q 40/08 705/4 |
| 2016/0133117 | A1* | 5/2016 | Geller | A61B 5/746 340/457 |
| 2017/0011398 | A1 | 1/2017 | Narasimhan | |
| 2017/0031080 | A1 | 2/2017 | Speer et al. | |
| 2017/0041737 | A1* | 2/2017 | Fischer | H04W 4/46 |
| 2017/0061461 | A1* | 3/2017 | Jajara | G06Q 20/405 |
| 2017/0184411 | A1* | 6/2017 | Glasgow | G01C 21/3617 |
| 2017/0300975 | A1* | 10/2017 | Iannace | G06Q 30/0266 |
| 2017/0310804 | A1* | 10/2017 | Rhyne | H04W 4/48 |
| 2017/0310816 | A1* | 10/2017 | Rhyne | H04W 4/48 |
| 2017/0323244 | A1* | 11/2017 | Rani | G07C 5/02 |
| 2017/0349182 | A1* | 12/2017 | Cordova | B60W 40/09 |
| 2018/0025554 | A1* | 1/2018 | Gibson | G01C 21/3679 701/36 |
| 2018/0070291 | A1* | 3/2018 | Breaux | H04W 4/40 |
| 2020/0074491 | A1 | 3/2020 | Scholl et al. | |
| 2021/0142419 | A1 | 5/2021 | Davis et al. | |
| 2021/0272210 | A1* | 9/2021 | Dahl | G07C 5/0816 |
| 2021/0398220 | A1* | 12/2021 | Hayward | G07C 5/008 |

OTHER PUBLICATIONS

Guinn, T., "Phone app gives people discounts for not texting while driving", Published Apr. 12, 2017, Web Page retrieved from: https://www.cbs7.com/content/news/Phone-app-gives-people-discounts-for-not-texting-while-driving-419265184.html, 2 pages.

* cited by examiner

SYSTEMS AND METHODS FOR DETECTING AND SCORING DRIVER ACTIVITY

BACKGROUND

The field of the disclosure relates generally to driver detection systems, and more specifically to network-based systems and methods for detecting and scoring driver behavior in real-time.

Distractions while driving often lead to catastrophic consequences including, in extreme cases, loss of property and life. Yet many drivers ignore the dangers and frequently engage in distracting activities such as holding conversations on mobile phones, reading, typing and sending messages, taking photographic or video recordings, watching videos, or other activities that may divert attention away from driving. As a result of the ubiquity of mobile devices, drivers are increasingly exposed to easily accessible communication and entertainment activities. Despite the increasing prevalence of such activities, modern automobiles provide few measures to prevent distracting activities from occurring within the vehicle during driving. Drivers are often left with self-imposed measures such as concealing mobile phones and tablets in glove compartments, trunks, or in opaque cases or bags to prevent or deter distraction. Moreover, concealing or disabling such devices prevents important information or communications from being received. In addition, extreme preventative measures may prevent passengers in the vehicle who could safely use a device from doing so. A practical and convenient way to detect driver activity and encourage drivers to focus and concentrate on safe driving is needed.

BRIEF DESCRIPTION

In one aspect, a driver scoring (DS) computing device for implementing a driver safety incentive program is provided. The DS computing device includes at least one processor in communication with at least one memory. The at least one processor is configured to receive sensor data about a driver in a vehicle, determine, from the sensor data, a driver activity including at least a duration for the activity and calculate a score for the determined activity. The score depends on at least one of a type of activity and the duration of the activity. The at least one processor is configured to retrieve a driver profile associated with the driver from the at least one memory. The driver profile includes at least one of user input preferences and a history of payment transactions. The at least one processor is configured to generate at least one merchant incentive based on the score and the driver profile.

In another aspect, a computer-implemented method implementing a driver safety incentive program using a driver scoring (DS) computing device is provided. The method is executed by a DS computing device including at least one processor in communication with at least one memory. The method includes receiving sensor data about a driver in a vehicle, determining, from the sensor data, a driver activity and a duration for the activity, and calculating a score for the determined activity. The score depends on at least one of a type of activity and the duration of the activity. The method further includes retrieving a driver profile associated with the driver from the at least one memory. The driver profile includes at least one of user input preferences and a history of payment transactions. The method further includes generating at least one merchant incentive based on the score and the driver profile.

In yet another aspect, a least one non-transitory, computer-readable storage medium for implementing a driver safety incentive program having computer-executable instructions embodied thereon is provided. When executed by a driver scoring (DS) computing device, the computer-executable instructions causes the processor to receive sensor data about a driver, determine, from the sensor data, a driver activity and a duration for the activity, and calculate a score for the determined activity. The score depends on at least one of a type of activity and the duration of the activity. The computer-executable instructions further cause the processor to retrieve a driver profile associated with the driver from the at least one memory. The driver profile includes at least one of user input preferences and a history of payment transactions. The computer-executable instructions further cause the processor to generate at least one merchant incentive based on the score and the driver profile.

BRIEF DESCRIPTION OF THE DRAWINGS

FIG. 1 is a schematic diagram illustrating an example vehicle having a driver scoring computing device in accordance with one embodiment of the present disclosure.

FIG. 2 is another schematic view of the example vehicle having the driver scoring computing device of FIG. 1.

FIG. 3 is an example data structure used by the driver scoring computing device of FIG. 1.

FIG. 4 is a simplified block diagram of an example computer system having the driver scoring computing device shown in FIG. 1.

FIG. 5 illustrates an example configuration of the user computing device shown in FIG. 4.

FIG. 6 illustrates an example configuration of the server system shown in FIG. 4.

FIG. 7 is a schematic diagram illustrating the example driver scoring computing system of FIG. 1 in communication with a payment processing network.

FIG. 8 is a flow diagram illustrating an example process for incentivizing safe driving behavior using the system shown in FIG. 1.

FIG. 9 is a diagram of components of one or more example computer devices that are used in the computing system shown in FIG. 1.

Figure 1:
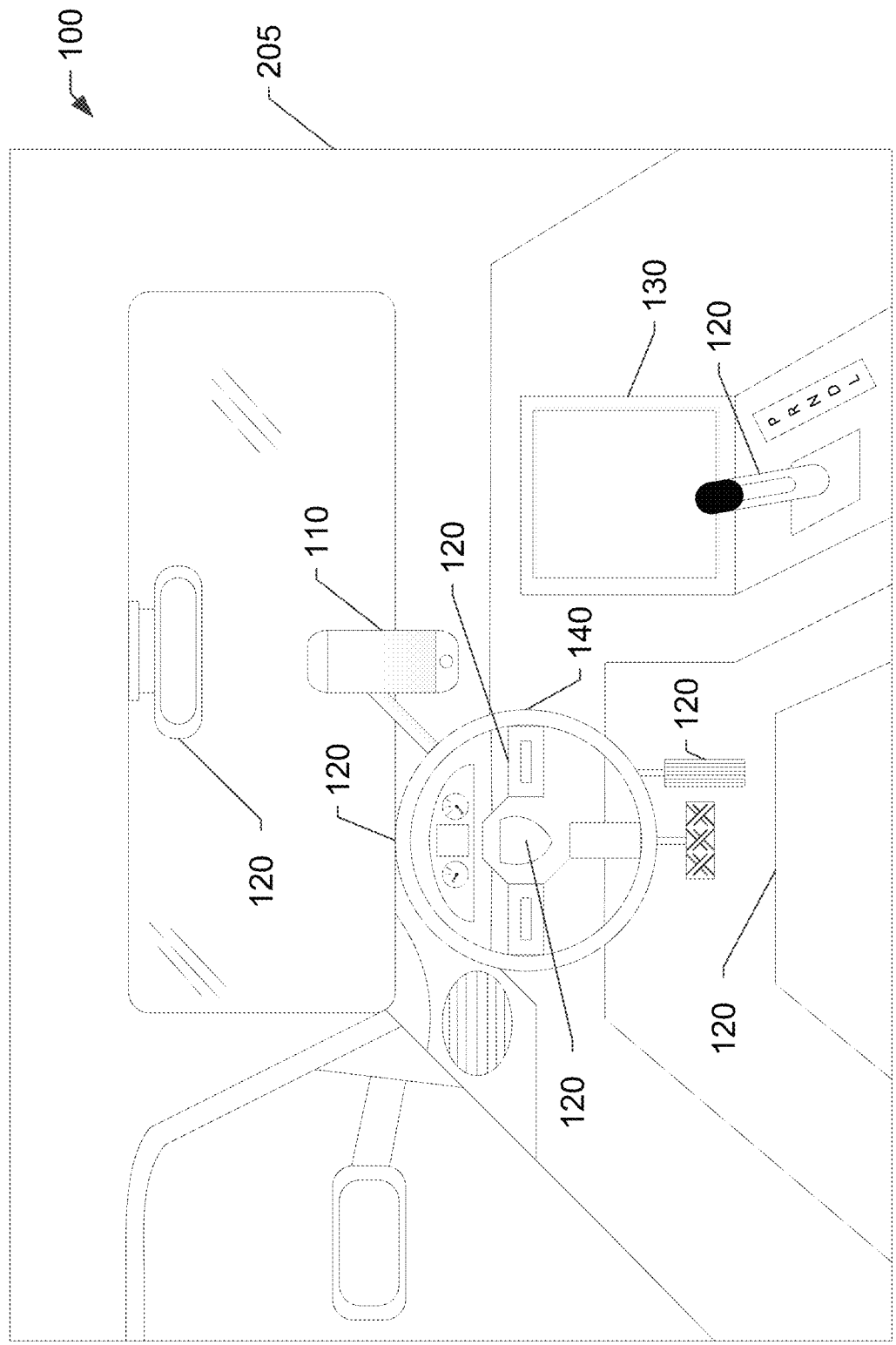
FIGS. 1-9 show example embodiments of the methods and systems described herein.

Like numbers in the Figures indicate the same or functionally similar components. Although specific features of various embodiments may be shown in some figures and not in others, this is for convenience only. Any feature of any figure may be referenced and/or claimed in combination with any feature of any other figure.

DETAILED DESCRIPTION

The following detailed description illustrates embodiments of the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to example embodiments, namely, methods and systems utilizing internal vehicle activity detection mechanisms, user behavioral pattern analysis, and real-time analysis and communication of customized incentives. Systems and methods according to the disclosure herein thus provide customized incentive mechanisms to users to elicit safer driving behavior patterns.

The system and methods described herein detect a user's activities while driving and determine customized incentive mechanisms for the user based on the detected driving activities and an analysis of the user's favorite activities. A user inclined to reduce dangerous driving habits or wishing to receive incentives registers with a driver scoring (DS) computing system. Registration with the DS computing system includes a user identifier, a vehicle identifier, a user computing device identifier, and merchant incentive preferences. In the example embodiment, the DS computing system is in communication with the vehicle, and/or with sensors associated with the vehicle, and/or vehicle control systems such as a vehicle controller, and/or an app on the user computing device. In preparation for driving, the DS computing system activates the app on the user computing device. The app is configured to detect use of the user computing device while the user is engaged in driving. In the example embodiment, vehicle control systems and sensors on the vehicle communicate with DS computing system to provide additional information about the driver. The DS computing system determines incentives based on driver data received from the user computing device and the vehicle sensors.

In the example embodiment, the DS computing system includes a driver scoring (DS) computing device that operates remotely from the user in a client-server configuration. The DS computing device communicates wirelessly (e.g., cellular network, the Internet, etc.) with the vehicle sensors and/or the user computing device to detect and/or monitor driver activity. The vehicle control systems, the sensors, and the user computing device are configured to transmit sensor and vehicle data to the DS computing device. In some embodiments, the DS computing device is installed on the vehicle by the manufacturer, for example as a module on the vehicle controller, or as an after-market add-on device. In such cases, the DS computing device is automatically configured to communicate with sensors installed on the vehicle to detect driver activity. In the example embodiment, the vehicle sensors and/or the user computing device periodically or continuously transmit data to the DS computing device. The DS computing device updates a database and records at least a duration and a type of driver activity. In some embodiments, the vehicle control system and/or the user computing device are configured to store detection and/or monitoring data for use by the DS computing system.

The vehicle may be any passenger vehicle. Alternatively, the vehicle may be any type of ground craft, aircraft, watercraft, or spacecraft vehicles (e.g., a van, bus, train, airplane, ferry, etc.). Sensors installed on the vehicle may be configured to detect the presence of the driver and/or passengers. Sensors may include infrared, microwave, laser, optical (e.g., video/photographic cameras), other electromagnetic frequency detectors, weight and/or load bearing sensors such as mass sensors affixed to the vehicle in places such as the suspension system or installed beneath individual seats, motion detection sensors, or other type of sensors configured to receive activity data associated with the vehicle. In some embodiments, a network of wireless transmitters such as Bluetooth® or Wi-Fi may be arranged throughout the vehicle and configured to triangulate the position of the user computing device. In the example embodiment, biometric sensors are installed on the vehicle. Sensors on the vehicle may be configured to detect aspects such as the location of the driver, passengers, or belongings in the vehicle. At least some sensors are also configured to verify the identity of occupants of the vehicle. In the example embodiment, biometric sensors are used by the DS computing system to verify that the user is in the driving position of the vehicle.

In the example embodiment, the vehicle includes autonomous or semi-autonomous technology or functionality to enable biometric identification. The DS computing device receives biometric data from a user via a biometric input device associated with the vehicle. As used herein, the term "biometric data" refers generally to the field of biometrics or biometric identification/authentication, in which characteristics or traits of humans are captured and analyzed, often for distinguishing one individual from another using a uniqueness of the characteristics or traits captured. Some examples of biometric data include fingerprints, DNA, facial images, retinal images, and voiceprints. Biometric data may be collected by sensors, such as biometric sensors (e.g., biometric input devices) on the vehicle. Biometric sensors may include any sensor configured to receive a biological signal uniquely identifying an individual, such as, but not limited to, retinal scanners, fingerprint scanners, facial recognition devices, voice input devices, and weight scales. In the example embodiment, the vehicle may have one or more biometric sensors inside the vehicle to facilitate the sampling of biometric data from users of the vehicle. Biometric input devices may include, but are not limited to, fingerprint scanners on a vehicle component near the driver, such as the dashboard, the console, or the steering wheel. In some embodiments, the biometric input device is a biometric steering wheel that continuously feeds biometric data of a user (e.g., a driver) to the DS computing device throughout an active trip (e.g., a currently occurring trip). In other embodiments, the biometric input device only receives biometric data from the user prior to the initiation of a trip.

The user computing device may be a mobile phone, watch, video player, audio player, recording device, communication device, or entertainment device (e.g., video game player, movie player, etc.). In some embodiments, multiple user computing devices are registered with the DS computing system. In the example embodiment, the user computing device is capable of communicating via a network (e.g., the Internet). Additionally, the user computing device has a method of notifying the user of a current driving score (e.g., audibly through speakers or visually via a display). Further, the user computing device is capable of monitoring and/or detecting whether a user has activated the user computing device and/or is interacting with the user computing device. Upon registration with the DS computing system, the user downloads and installs an app onto the user computing device. In the example embodiment, the app is configured to at least detect user activity on the user computing device. In some embodiments, the app additionally notifies users of other information associated with the DS computing system (e.g., incentives, activity warnings, current driving score, etc.).

In the example embodiment, merchants register with the DS computing system to provide incentives to registered users. Merchants using the DS computing system have an opportunity to provide offers to registered users similar to other advertising and marketing campaigns. Offering discounts and the like through the DS computing system allows merchants to determine unique, targeted offers to specific users based on the driving data and the payment transaction data. In addition, merchants may receive goodwill from encouraging users to reduce distracting activities while driving. The DS computing system therefore increases both opportunities for sales as well as positive public relations from encouraging drivers to reduce dangerous driving habits. In some embodiments, other organizations or institutions (e.g., state bureau of motor vehicles, universities, driving clubs, social clubs, health organizations, etc.) may register with the DS computing system to provide incentives. Methods for implementing incentives are described in further detail below.

In the example embodiment, the DS computing device is in communication with the above-described components of the system. The DS computing device is configured to receive data from the sensors on the vehicle (via the vehicle controller and/or directly from the sensors), from sensors attached to or within the user computing device, from the app installed on the user computing device, merchant information (described below), and payment transaction data from a payment processor. The DS computing device converts the received sensor data, payment transaction data, and merchant information, and stores it in a database with the user profile. If it is determined that the vehicle is in motion, the DS computing device is configured to calculate a score for the driver based on the sensor data. The score for the driver represents the level and type of activity the driver is engaged in. In the example embodiment, the score is used to determine an appropriate incentive. In other embodiments, the score may be transmitted to merchants. The merchants may then determine appropriate incentives to transmit to the DS computing device. In the example embodiment, the DS computing device determines appropriate methods and times to provide the incentive to the driver.

Initially, the user registers with the DS computing system. Registration with the system includes registering at least one user computing device and at least one vehicle driven by the user. The DS computing device is configured to monitor and/or detect activity on the registered user computing device while the user is driving. In some embodiments, the DS computing device may require that certain devices be registered (e.g., a mobile phone). In the example embodiment, the registered user computing device is in communication with the registered vehicle and also in communication with the DS computing device. In some embodiments, the vehicle is also in direct communication with the DS computing device.

Registration with the DS computing system also includes registering at least one vehicle which the user may designate as the primary vehicle to be driven by the user. Registration of the vehicle includes at least identifying the vehicle by a simple identifier. The DS computing device uses the onboard computer controller of the vehicle to coordinate the existing vehicle components and sensors. Installation of additional sensors may improve detection of driver activity and/or whether the user is the driver of the vehicle or a passenger of the vehicle and/or if the driver of the vehicle is the registered user.

In some embodiments, multiple users that are registered with the system may elect to participate in competitions with one another. Upon registration, the user selects among other registered users or identifies other users to include as part of a competitive group. For example, a group of users that are friends will be able to view each person's driving score in this configuration. The DS computing system may include a website to display the collective scores in addition to other information. In some embodiments, the DS computing system transmits periodic messages to other registered users within a collection of users indicating particular honors, badges, achievements, or trophies. In some embodiments, the user may additionally select social media accounts to automatically post driving scores. Multiple users can be ranked according to the individual driving scores, and as users engage in positive driving behavior, they may increase in rank, displacing others. The rankings will be distributed among the selected group of users and may further encourage users to improve their driving habits.

In the example embodiment, the user computing device is a mobile phone or other suitable device capable of wireless communication. For example, the user computing device is capable of accessing the Internet, Wi-Fi, and cellular networks. The app may be configured to periodically communicate with the DS computing device. In the example embodiment, the app automatically activates when the user enters a registered vehicle. In other embodiments, the user manually activates the driver scoring app (e.g., by unlocking the mobile phone, selecting the app, and launching the app). The user computing device may be configured to detect the presence of the registered vehicle. Alternatively or additionally, the vehicle may be configured to detect the presence of the user computing device. In other embodiments, the user initially activates the vehicle (e.g., using a key or pressing a start button), which then communicates with the DS computing device, and/or also communicates with the user computing device and causes the user computing device to launch the app.

In the example embodiment, the DS computing device compares received biometric data (e.g., sample data) from the user within the vehicle to a baseline biometric data stored in the memory to identify the driver. As used herein, "baseline biometric data" refers to reference data of authorized drivers of the vehicle to which sample data received from users of the vehicle can be compared. For example, the list of authorized drivers of the vehicle may include those listed as a named insured and/or an authorized driver under an automobile insurance policy for vehicle. In the example embodiment, the list of authorized drivers initially includes only the user that registers with the DS computing system. Upon registration, the initially registered user may reconfigure the DS computing system to include additional authorized drivers. In the example embodiment, authorized drivers provide biometric data, such as fingerprints, facial scans, and/or retinal scans to the DS computing system. The provided biometric data is used by the DS computing system as baseline biometric data. In some embodiments, authorized users may have previously provided baseline biometric data to third parties such as an insurance provider of the automobile insurance policy associated with the vehicle. In these embodiments, the DS computing system may be in communication with the third parties via, for example, insurance networks, to access the baseline biometric data.

In the example embodiment, the DS computing device determines, from the comparison, whether the user is an authorized driver. If the received sample data matches the stored baseline biometric data, the DS computing device recognizes the user as an authorized driver and associates the active trip with the driver. If the DS computing device does not recognize the user as an authorized driver, the DS computing device may prompt the user to provide a different type of biometric sample data and/or to try again and/or authenticate under alternative methods (e.g., using a code or password on the app). If the user is not an authorized driver, the DS computing device does not associate the active trip with the user. In the example embodiment, the DS computing device detects a user computing device, such as a mobile device associated with the driver, inside the vehicle. The DS computing device may communicate with the user computing device, for example, via the Internet, Bluetooth®, or any other wired or wireless connection (e.g., Near Field Communication) over one or more radio links or wireless communication channels. For example, the user computing device may automatically pair with a vehicle system (e.g., vehicle controller) via Bluetooth® and the DS computing device may communicate with the vehicle controller to identify the user device. In some embodiments, upon detecting the user computing device, the DS computing device causes the user computing device to automatically activate (e.g., launch, open, etc.) an application on the user computing device. The application detects a state (e.g., inactive or active) of the user computing device. In some embodiments, the application automatically switches the user computing device from an active state to an inactive state before the trip.

In the example embodiment, the DS computing device communicates with the user computing device to monitor a state of the user computing device during an active trip. The DS computing device monitors and/or detects whether the user computing device is in an active state or an inactive state by using GPS, cellular triangulation, and biometrics data of the driver. As used herein, "inactive state" refers to a locked mode where the screen of the user computing device is locked. In some embodiments, applications may be running in the background, such as location services and/or the activated application, while the user computing device is in an inactive state. In locked mode (e.g., inactive state), the user computing device may display minimum information (e.g., time and date on a locked screen or home screen) and receive incoming communications. To switch from the inactive state to an active state, the driver must actively swipe the screen, provide a physical unlock gesture (e.g., moving and/or shaking the user computing device), and/or provide identification information (e.g., passcode and/or biometric data) to access the applications and/or contents of the user computing device. In some embodiments, the inactive state may also include a child mode and/or a hands-free mode. As used herein, "child mode" refers to a setting offered by the user computing device that restricts usage to child friendly, parent-approved applications. Thus, the DS computing device may recognize that the driver's user computing device is inactive, with respect to the driver, by detecting the setting (e.g., do not disturb mode, child mode, driving mode) of the user computing device. In one example, the DS computing device may detect that someone is playing a game on the driver's user computing device. In this example, the DS computing device may determine that the user computing device is in an inactive state for the driver's trip because the DS computing device concurrently detects both of the driver's hands on a biometric steering wheel. Alternatively or additionally, the user computing device is configured for a "passenger mode" setting restricting the user computing device to certain applications (e.g., music, mapping and directions, etc.), and the "passenger mode" is scored as an inactive state.

"Usage data" as referred to herein includes information as to the inactive state and the active state during a trip. For example, usage data includes a time and/or a distance the driver's user computing device spends in each state during the active trip. For example, usage data provides information as to how often the user computing device switches between the two states during an active trip. For example, for a 30 minute trip, the DS computing device may determine that the user computing device was in an inactive state for the first 20 minutes of the trip, and in an active state for the remaining 10 minutes of the trip. In this example, the DS computing device may further determine that during the inactive state, the driver received an incoming call and held a conversation for 20 minutes. The DS computing device may categorize the incoming call and the subsequent conversation as the user computing device being in an inactive state by detecting that the call was conducted through the vehicle's Bluetooth® system rather than directly through the driver's user computing device. The DS computing device may further determine the geographical location where the incoming call was received (e.g., map coordinates, school zone, construction zone, parking lot) by utilizing a GPS-related system such as a vehicle location system and/or a user computing device locator.

In some embodiments, driving data associated with the driver's driving characteristics includes data received from vehicle sensors monitoring the state of the driver's user computing device during a trip. In other embodiments, the monitoring data is retrieved from the user computing device. In other embodiments, the user computing device transmits push notifications to the DS computing device indicating activity on the user computing device. In some embodiments, where the vehicle is a semi-autonomous or a regular vehicle (e.g., driver-controlled vehicle), such that a driver controls the vehicle during part or the entirety of one or more trips, the DS computing device interprets sensor information to collect and/or generate telematics data (e.g., driving data) associated with driving characteristics of the driver. In some embodiments, the user computing device is a mobile device, such as the driver's phone. In these embodiments, the DS computing device may obtain telematics data from the vehicle via Bluetooth®, Internet, Universal Serial Bus (USB), On-Board Diagnostics (OBDII) port, or any other wired or wireless connection. For example, the vehicle controller may collect vehicle telematics data from the driver's user computing device and/or one or more sensors on the vehicle. For example, the user computing device may be capable of GPS and/or other (e.g., Wi-Fi) location services. Vehicle telematics data may include data from the user computing device and/or one or more of vehicle sensors, and may include navigation, communications, safety, security, and/or "infotainment" data. For example, vehicle telematics data collected and analyzed may include, but is not limited to, braking and/or acceleration data, navigation data, vehicle settings, and/or any other telematics data.

In certain embodiments, the driver is rewarded for having the user computing device in an inactive state during a trip. The DS computing device may calculate a score for the user's driving activities based on how often the driver's user computing device is in an inactive state during a trip. For example, the score for the active trip is based on at least one of distance traveled and time duration of the inactive state. Scores may be calculated periodically (e.g., daily, weekly, monthly), based upon a pre-determined timeframe, or alternatively, continuously. In some embodiments, the score represents inactive state duration compared to the total trip duration.

In some embodiments, the DS computing device detects, from the received telematics data and/or onboard sensors, that the driver has stopped the vehicle to use the user computing device (e.g., mobile device). For example, the DS computing device detects from the vehicle sensors, such as GPS and/or a vehicle's tracking system, that the driver has pulled the vehicle off to the side of the road and/or made a brief stop at, for example, a gas station, rest stop, restaurant, and/or convenience store during an active trip to a final destination. In this example, the DS computing device detects that (i) the vehicle is parked (e.g., in a parking mode), and (ii) the mobile device has switched from the inactive state to the active state. Based on the detection, in these embodiments, the DS computing device rewards the driver for stopping the vehicle to use the mobile device rather than using the mobile device while the vehicle is in motion. In other embodiments, the DS computing device rewards the driver for waiting to use the mobile device until the vehicle is in a parking mode, even though the driver has not yet reached the final destination (e.g., finished the active trip). The DS computing device uses telematics data to distinguish between parking mode (e.g., where a vehicle is parked) and temporary halt motions of the vehicle while the driver waits at an intersection, red light, and/or stop sign (e.g., where the driver's foot is actively pressing on the brake pedal). Driving rewards are calculated based on safe driving practices in accordance with standards and guidelines, such as those provided by the National Transportation Safety Board (NTSB) and the National Highway Traffic Safety Administration (NHTSA).

In the example embodiment, the DS computing device further retrieves and incorporates the user's preferences for incentives that were input during registration. For example, if the user is interested in receiving incentives based on a performance score, the DS computing system is configured to transmit periodic updates or reports to the registered user computing device. Additionally or alternatively, the DS computing device transmits periodic reports to the user through other communication channels, such as email, fax, telephone, or post mail. In other embodiments, the DS computing system hosts a website to display the driving performance data to the user. The user logs in to the website to view the driving score. In some embodiments, the user logs into the DS computing system directly to view additional information about the user's driving and about the customized incentives for the user.

In the example embodiment, the DS computing system determines preferred incentives by generating scores from the driving data. In the example embodiment, the DS computing system further examines a history of the user's payment transactions to select incentives. For example, the DS computing system may retrieve and/or monitor payment transactions on a payment processing network. For example, the user engages in payment transactions at merchant locations or online, through a website, and/or through another card-not-present payment transaction. In some embodiments, the DS computing system is configured to receive historical payment transaction data for the payment transactions. In other embodiments, the DS computing system monitors a payment transaction processing network for transactions currently being processed over the network. In some embodiments, the DS computing system receives payment transaction data directly from a merchant. The payment transaction data includes a cardholder identifier for the cardholder executing the payment transaction. The payment transaction data also includes a merchant location and a transaction amount. In some embodiments, the payment transaction data also includes other information related to the particular product or service associated with the transaction (e.g., product or service category, features or characteristics of the product such as the size, frequency of fraudulent transactions associated with the particular product or service, etc.). In some embodiments, the score, along with location information, is transmitted to merchants. The merchant is prompted to determine appropriate incentives based on the score and the location data. In other embodiments, the merchant provides a range of incentives to the DS computing system. The DS computing system determines the incentive based on the score, location, and payment transaction history of the user.

In the example embodiment, the DS computing system stores the payment transaction data in a database for further processing and/or analysis. A model is generated based on the user's previous payment transactions. For example, more recent payment transactions at a particular merchant may be receive a greater weight in the model while less recent payment transactions at merchants may receive a lesser weight in the model. Additionally or alternatively, the payment transaction data includes merchant data such as merchant type and/or category, spend amount, frequency of and number of visits by the registered user, time of visit, and product or service purchased. A statistical analysis may be used to determine the user's preferred merchants, locations, and/or products and services. The model, including the payment transaction data, may then be used by the DS computing system to determine a preferred incentive. Additionally or alternatively, parameters may be specified for the model to determine a preferred incentive. In some embodiments, machine learning techniques further enhance the determining of the preferred incentive.

In some embodiments, the driver is penalized for having the user computing device in an active state during the trip. In these embodiments, the driver may be penalized for switching the user computing device from an inactive state to an active state while the vehicle is in motion (e.g., during the active trip). Additionally or alternatively, the driver may be penalized for the duration over which the user computing device is detected to be in an active state. For example, the DS computing device may detect that the driver's user computing device was switched from an inactive state to an active state 3 times during the trip. In this example, the DS computing device penalizes the driver by reducing the driver's score by a predefined amount and/or percentage. The reduction may result in altered incentives. For example, if the driver elected to receive a discount at a nearby merchant, the discount would be reduced due to the driver's use of the user computing device during active trips by an amount associated with the duration of the active state. Additionally or alternatively, the type of activity the driver has engaged in on the user computing device may impact the determined incentive.

In other embodiments, the DS computing device penalizes the driver by disabling certain functions of the driver's user computing device for a designated period of time. In these embodiments, the DS computing device transmits a signal to an application on the driver's user computing device to disable and/or partially disable the user computing device. Additionally or alternatively, the user computing device may be configured to display a predetermined message on the display screen or play a prerecorded audio message or sound. In some embodiments, the user computing device may be configured to vibrate or execute other movements.

In further embodiments, the DS computing device penalizes the driver by deactivating a payment account associated with the driver for a designated period of time. In these embodiments, the DS computing system stores a payment account associated with the driver in a database. For example, the payment account information may previously have been provided to the DS computing system by the driver during a registration process, and/or by a merchant or other institution (e.g., university, school, government, employer, etc.) associated with the driver. For example, if the user is engaged in texting, talking, reading, accessing the Internet, recording audio or video, or taking photographs while driving the vehicle, the DS computing device determines the driver is distracted and deactivates the payment account. In another embodiment, the DS computing device penalizes the driver by receiving automatic payments from a payment account associated with the driver each time the driver's user computing device is detected to be in an active state. In these embodiments, the driver selects a penalty option where, upon detecting use of the driver's user computing device during an active trip, the DS computing device transmits a payment request for a predetermined amount to a payment network associated with a payment account tied to the driver. The DS computing device may transmit a payment request each time the driver's user computing device is detected to be in an active state. For example, during a registration process, the driver authorizes automatic payments of $5 for every time the driver's user computing device is detected to be in an active state during an active trip. In certain embodiments, the DS computing device transmits a payment request for a total number of active state detections during a predetermined period of time. In the above example, if the DS computing device detected the driver's user computing device in an active state 10 times over a week, the DS computing device transmits a single payment request at the end of the week for $50 to a payment network associated with the driver's payment account.

In some embodiments, the incentives that a user selects from are categorized (e.g., restaurants, bars, movie theaters, amusement parks, gas stations, tourist attractions, amusement parks, hotels, museums, etc.). The user will then be provided an opportunity to select among groups of incentives during registration or through configuration of a user profile stored with the DS computing system (e.g., selecting preferred restaurants, nearby movie theaters, etc.). In some embodiments, the incentive provided is a cash reward delivered to the user as a check in the mail, or electronically transmitted to the user's registered bank account. In other embodiments, the cash rewards are automatically transmitted as electronic gift cards or held for the user at a retail merchant. In some embodiments, the incentive includes reward points (e.g. for travel or airlines), coupons, or promotional giveaways. In other embodiments, the incentive is a coupon to be redeemed at a merchant venue (e.g., retail location, online, etc.). In some embodiments, the incentive may be a payment credit for a bill (utility bill, credit card bill, rent, etc.).

In the example embodiment, the DS computing device generates a report that includes information such as the state(s) of the user computing device during a trip, the driving data (including the sensor data) described above, and/or the calculated rewards or other incentives. The report may be generated daily, weekly, and/or monthly, and the reporting period may depend on how often the driver uses the vehicle. The DS computing device transmits the generated report to the driver's user computing device and/or to the user via another communication channel, and in some embodiments, the DS computing device also transmits the generated report to a remote-computing device associated with a merchant. For example, the generated report may be transmitted to a merchant associated with the driver to allow the merchant to review the calculations and distribute merchant incentives (discounts, coupons, etc.). In another example, the report may be transmitted to social media for users to compare with other users, as described above.

In the example embodiment, the DS computing device transmits a message to the user computing device. The message includes at least the incentive. If the user has selected a score as a basis for the incentive, the message includes at least the determined score. The score presented to the user may also include badges, achievements, honors, or trophies if the score is determined to be above a certain threshold. For example, an hour of consecutive undistracted driving may earn the user a silver medal and two hours of consecutive undistracted driving may earn the driver a gold medal. The user may then accumulate multiple badges, achievements, honors, or trophies for accumulated points in the score or if the score has exceeded incremental predetermined thresholds. In other embodiments, the communication to the user is in the form of an alert. The DS computing device causes the vehicle to initiate an audible alert notifying the user of a nearby opportunity to cash-in or redeem the reward. For example, the DS computing device may cause the vehicle's speakers to indicate that a preferred retail merchant is nearby and that the user has earned a reward for that merchant.

In some embodiments, the registration of users includes opt-in informed consent of users to data usage by the DS computing system consistent with consumer protection laws and privacy regulations. In some embodiments, the enrollment data and/or other collected data may be anonymized and/or aggregated prior to receipt such that no personally identifiable information (PII) is received. In other embodiments, the system may be configured to receive enrollment data and/or other collected data that is not yet anonymized and/or aggregated, and thus may be configured to anonymize and aggregate the data. In such embodiments, any PII received by the system is received and processed in an encrypted format, or is received with the consent of the individual with which the PII is associated. In situations in which the systems discussed herein collect personal information about individuals, or may make use of such personal information, the individuals may be provided with an opportunity to control whether such information is collected or to control whether and/or how such information is used. In addition, certain data may be processed in one or more ways before it is stored or used, so that personally identifiable information is removed.

At least one of the technical problems addressed by this system includes: (i) monitoring and detecting distracted driver activity; (ii) determining the presence and location of registered users in a vehicle; (iii) analyzing and scoring driver activities; and (iv) incentivizing safe driving behavior by providing preferred incentives.

A technical effect of the systems and processes described herein is achieved by performing at least one of the following steps: (i) receiving sensor data about a driver; (ii) determining, using the sensor data, a driver activity; (iii) calculating a score for the driver activity; (iv) retrieving a driver profile; and (v) generating at least one merchant incentive based on the score and the driver profile.

Described herein are computer systems such as a driver scoring computer system. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, ORACLE® Database, MySQL, IBM® DB2, MICROSOFT® SQL Server, SYBASE®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California)

In another embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "payment device," "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Moreover, these terms may refer to payments made directly from or using bank accounts, stored valued accounts, mobile wallets, etc., and accordingly are not limited to physical devices but rather refer generally to payment credentials. Each type of payment device can be used as a method of payment for performing a transaction. In addition, consumer card account behavior can include but is not limited to purchases, management activities (e.g., balance checking), bill payments, achievement of targets (meeting account balance goals, paying bills on time), and/or product registrations (e.g., mobile application downloads).

As used herein, the term the terms "real time" refers to substantially simultaneous or near instantaneous transfer of information. The information transfer may pertain specifically to processing payment transactions or generally to data transmitted from one component and received by a second component. The transfer of information may be executed across a network or internally within a system. In the embodiments described herein, the time it takes to process a payment card transaction is executed in real time. In the embodiments described herein, the time it takes to receive driver activity data and generate merchant incentives is executed in real time. The time period, for processing payment transactions, is measured in seconds or in some cases, less than seconds (milliseconds).

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or user computing devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, user computing device, vehicle telematics, autonomous vehicle, and/or intelligent home telematics data. The machine learning programs may utilize deep learning algorithms that may be primarily focused on pattern recognition, and may be trained after processing multiple examples. The machine learning programs may include Bayesian Program Learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the user computing device, driver, and/or vehicle from device details, user computing device sensors, geolocation information, image data, and/or other data.

Based upon these analyses, the processing element may learn how to identify characteristics and patterns that may then be applied to analyzing sensor data, authentication data, payment transaction data, image data, user computing device data, and/or other data. For example, the processing element may learn, with the user's permission or affirmative consent, to identify if the vehicle is traveling based upon minimal information or despite a lack of updates from a user and/or the user computing device. The processing element may also learn how to identify different types of routes and/or driver behaviors and/or user preferences based upon differences in the received sensor data.

The systems and processes are not limited to the specific embodiments described herein. In addition, components of each system and each process can be practiced independent and separate from other components and processes described herein. Each component and process also can be used in combination with other packages and processes.

The following detailed description illustrates embodiments of the disclosure by way of example and not by way of limitation. It is contemplated that the disclosure has general application to identifying driver activities and generating customized incentives to increase safe driving behavior.

Figure 2:
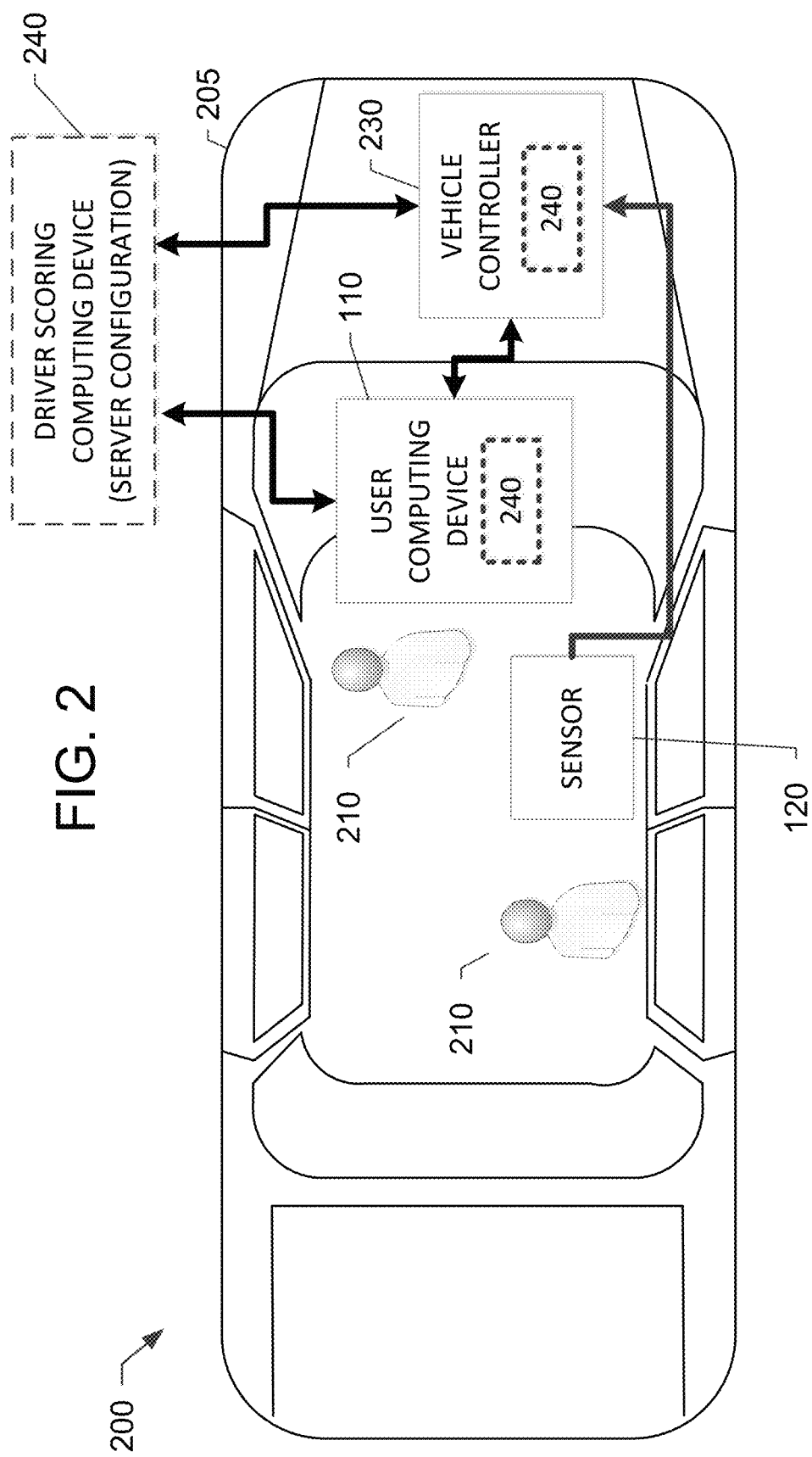

FIG. 1 depicts an example use case 100 for detecting driver and scoring driver activity to determine preferred incentives for encouraging safe driving using a driver scoring (DS) scoring system 400 (shown in FIG. 4) in accordance with one embodiment of the present disclosure. FIG. 2 is a schematic diagram of an example overhead view 200 of an example vehicle 205 of example use case 100. Vehicle 205 includes a plurality of sensors 120 and a vehicle controller 230. In the example embodiment, vehicle 205 includes one or more sensors 120, such as biometric sensors, to determine which user 210 is the driver for a trip. Sensors 120 include any sensor configured to receive a biological signal uniquely identifying an individual, such as, but not limited to, retinal scanners, fingerprint scanners, facial recognition devices, and weight scales. In the example embodiment, vehicle 205 receives data from one or more biometric sensors 120 (e.g., biometric sensors) to facilitate the sampling of biometric data from users of vehicle 205. Sensors 120 may be located on a component of vehicle 205 easily accessible by the driver, such as the dashboard, the console, or the steering wheel. Biometric data includes fingerprints, DNA, facial images, retinal images, and/or voiceprints. In some embodiments, the biometric input device collects biometric data (e.g., sample data) and transmits the data to other system components for analysis. In particular, example use case 100 illustrates one version of using sensors 120 (e.g., biometric input devices, cameras, load bearing sensors, etc.) to detect user 210 in vehicle 205 and to capture data relating to user 210 in real-time.

As described above, vehicle 205 may include autonomous or semi-autonomous technology or functionality that includes and/or is related to biometric identification. In some embodiments, vehicle controller 230 determines whether the driver is distracted by using biometric data received from sensors 120. For example, biometric sensors 120 are positioned at various locations around a steering wheel 140 of vehicle 205. Sensors 120 are configured to detect user 210 as the driver. In the example embodiment, user 210 places hands on sensors 120. In some embodiments, biometric sensors 120 are embedded throughout the rim of steering wheel 140. In these embodiments, vehicle controller 230 (shown in FIG. 2) not only detects user 210 as the driver, but also continuously monitors whether or not user's 210 hands are on sensors 120 during a trip. For example, vehicle controller 230 monitors whether one hand or both hands are on sensors 120 on steering wheel 140 during an active trip. In this example, driving rewards (e.g., incentives) are determined based on the extent to which user 210 maintains hands on sensors 120 during the trip. For example, vehicle controller 230 detects that the driver is using user computing device 110 (e.g., smartphone) based on detecting that only one hand is placed on sensors 120 on steering wheel 140. In other embodiments, sensors 120 are strategically positioned on a spoke and/or the central pad of steering wheel 140. In these embodiments, the driver is prompted to provide biometric data at the start of the trip by pressing finger(s) or hand(s) against the sensor 120 on the spoke and/or the central pad. In other embodiments, the driver is prompted to provide biometric data periodically throughout the active trip. Additionally or alternatively, depending on the placement of sensors 120, vehicle controller 230 prompts the driver to place their hand(s) on the dashboard (not shown) directly in front of the driver. In further embodiments, vehicle 205 is equipped with sensors 120 to include a biometric input device near the driver, separate from the steering wheel. In some embodiments, sensors 120 include one or more cameras and/or scanners that are configured to take photographic images and/or record video of the driver. For example, sensors 120 may include, but are not limited to, a camera that captures facial images and/or a retinal scanner.

Figure 4:
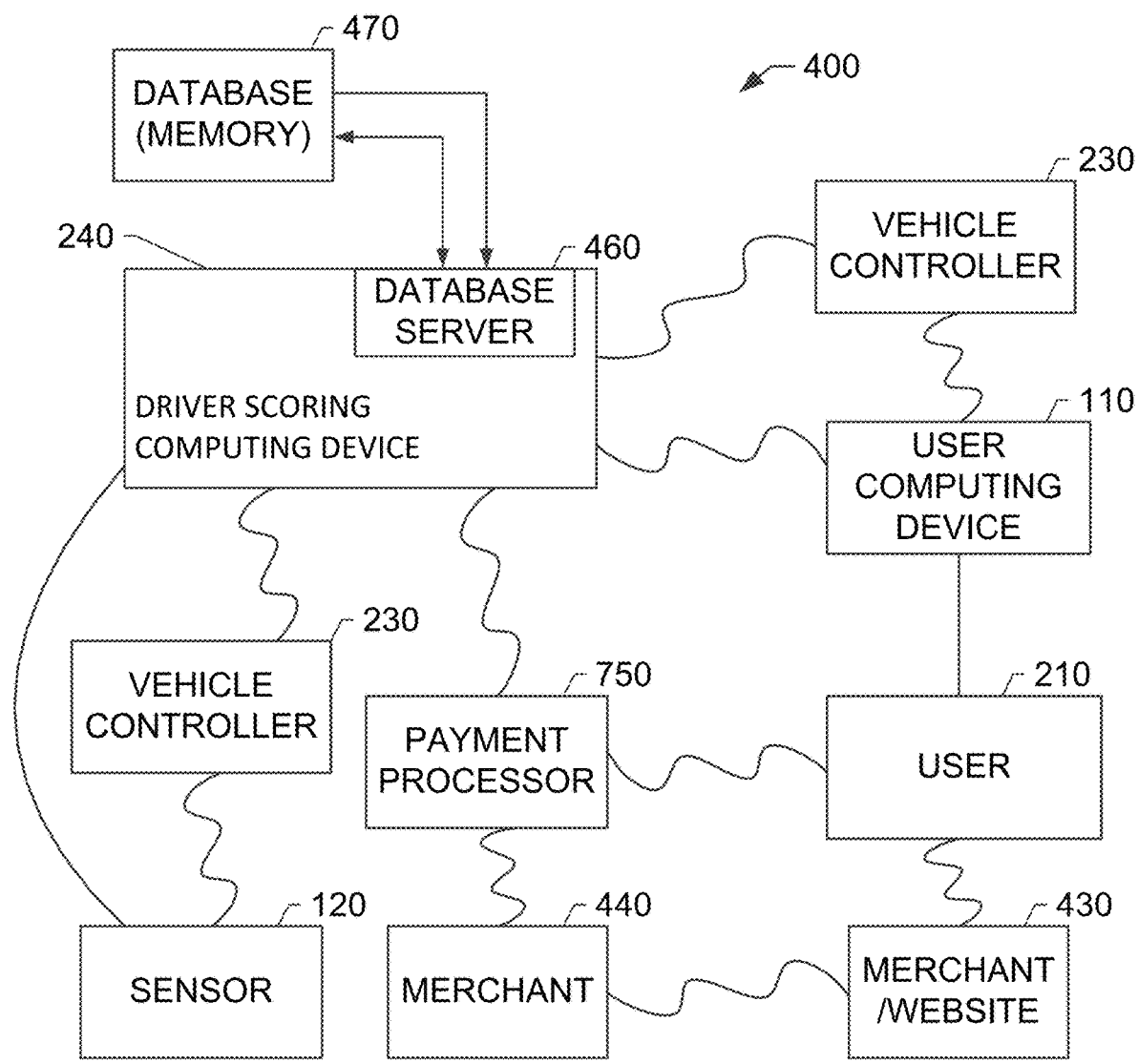

In the example embodiment, DS computing device 240 (shown in FIG. 4) detects that user 210 is the driver by comparing the biometric data received for the active trip to baseline biometric data stored in a database, such as database 470 (shown in FIG. 4). The baseline biometric data includes data for only authorized drivers of vehicle 205. In certain embodiments, vehicle 205 stores in a memory device different types of biometric data, such as fingerprints, DNA, facial images, retinal images, and/or voice images. In these embodiments, DS computing device 240 conducts a multi-step verification process to identify user 210 as the driver. For example, DS computing device 240 may receive fingerprint data and a facial image of a user via vehicle controller 230. In this example, DS computing device 240 compares both the fingerprint data and the facial image to the baseline biometric data to verify that that user 210 is the driver.

In the example embodiment, DS computing device 240 is in communication with user computing device 110 of the driver via vehicle controller 230. In the example embodiment, user computing device 110 is inside vehicle 205.

Before starting the trip, user computing device 110 connects with vehicle 205 via any wired or wireless connection (e.g., Bluetooth®) over one or more radio links or wireless communication channels. Vehicle controller 230 determines that a paired user computing device 110 is associated with the driver because it is the only user computing device 110 paired with vehicle 205. In some cases, if more than one user computing device 110 is present, vehicle controller 230 is configured to determine which device is associated with the driver as described below. For example, sensors 120 are configured to determine the location of passengers and devices within vehicle 205. In some embodiments, vehicle controller 230 utilizes stored identification data (e.g., IMEI, MEID, ESN) of user computing device 110 to verify that user computing device 110 is associated with the driver. In these embodiments, user's 210 user computing device 110 may be the only user computing device 110 registered with vehicle 205. In other embodiments, the locations of the registered users within vehicle 205 and the locations of the registered user computing devices are used to determine the driver and the associated user computing device 110.

In the example embodiment, the driver has previously registered user computing device 110 with a merchant 440 (shown in FIG. 4). In these embodiments, DS computing device 240 is in communication with the merchant 440 and has access to information stored by the merchant and associated with user's 210 user computing device 110. For example, after identifying all potential users in vehicle 205 from received biometric data and determining that user 210 is the driver, DS computing device 240 receives, from merchant 440, data for user 210 to determine if appropriate incentives are available.

In other embodiments, vehicle 205 is in communication with one or more user computing devices 110 that are each associated with one of users 210 within vehicle 205. In one embodiment, at the beginning and/or at the end of a trip, the application on user computing device 110 prompts for a selection of which user 210 is/was the driver of the trip, and DS computing device 240 records the selected the driver as the driver for the trip, such that telematics data associated with that trip is attributed to the correct driver. In some embodiments, this method is employed as a validation or verification step in addition to receiving biometric data of user 210, as disclosed above. For example, after a trip in which the driver is determined using sensors 120, the application on user computing device 110 prompts confirmation that the associated user 210 was, in fact, (i) the driver of the trip and (ii) associated with the paired user computing device 110 (e.g., vehicle 205 paired with user's 210 user computing device 110). DS computing device 240 receives an indication of a positive or negative response to the prompt, and confirms recorded data for the trip. In still other embodiments, DS computing device 240 uses additional vehicle telematics data in addition to using the received biometric data, such as sensor information from sensors 120, and data from a paired user computing device 110, to determine which user 210 is the driver when multiple user computing devices 110 pair with vehicle 205 during a single trip.

Vehicle 205 also includes a user interface 130 in communication with vehicle controller 230 that enables the driver to communicate with vehicle 205. In some embodiments, vehicle 205 includes an infotainment system, which enables the driver to engage with applications and functions such as maps, real-time navigation (e.g., GPS), and music through vehicle 205 rather than through user computing device 110. In further embodiments, user interface 130 displays applications from user's 210 user computing device 110 after connecting with user's 210 user computing device 110. For example, prior to the trip, the driver selects applications, such as audiobooks, from user computing device 110 to be in communication with vehicle controller 230. In this example, the driver accesses the selected applications via user interface 130 rather than directly through user computing device 110 (e.g., by unlocking the phone and accessing each application on the phone).

In the example embodiment, upon connecting with user computing device 110, vehicle controller 230 automatically activates (e.g., launches, initiates, opens, executes, etc.) an application that switches user computing device 110 into an inactive mode. For example, the application may turn on a "do not disturb" or driving mode setting on user computing device 110 without the driver having to manually select the desired setting on user computing device 110. In other embodiments, vehicle controller 230 detects that user computing device 110 is in a child mode. Child mode may be implemented via a setting on user computing device 110 or via applications offered by user computing device 110 that restricts usage to parent-approved content. In these embodiments, based on the selected setting (e.g., child mode), vehicle controller 230 determines that someone other than the driver is using user computing device 110 in vehicle 205 while the driver is driving during the trip. In some embodiments, vehicle controller 230 confirms that the driver is not using user computing device 110 because vehicle controller 230 is continuously receiving biometric data from the driver via sensor 120.

In the example embodiment, vehicle 205 includes additional sensors 120 other than biometric sensors. For example, vehicle 205 includes a weight scale (or pressure sensor) associated with the driver's seat and/or with the passenger's seats. Vehicle controller 230 stores a registered weight associated with each user of vehicle 205. When any user 210 sits in any of the seats, the user's weight is measured by the scale and the particular user 210 may be identified.

In another example, vehicle 205 includes sensors 120 that detect the current surroundings and location of vehicle 205. Such sensors 120 may include, but are not limited to, radar, LIDAR, Global Positioning System (GPS), video devices, imaging devices, cameras, audio recorders, and computer vision. Sensors 120 are configured to detect conditions of vehicle 205, such as speed, acceleration, gear, braking, cornering, direction, rate of acceleration, rate of deceleration, location, position, orientation, and rotation of the vehicle, and a measurement of one or more changes to any of the vehicle operation variables. Furthermore, sensors 120 may include impact sensors that detect impacts to vehicle 205, including force and direction, and sensors that detect other actions of vehicle 205, such the deployment of airbags.

In some embodiments, in addition to detecting the presence of the driver, sensors 120 also detect the presence of one or more passengers in vehicle 205. In these embodiments, sensors 120 detect the presence of fastened seatbelts, the weight in each seat in vehicle 205, heat signatures, or any other method of detecting information about the driver and passengers in vehicle 205. In some cases, one of the detected passengers may also be a registered user 210.

In certain embodiments, in addition to biometric sensors 120, vehicle 205 includes occupant position sensors 120 to determine a location and/or position of each occupant (e.g., the driver and, in some embodiments, passengers) in vehicle 205. In these embodiments, the location of an occupant may identify a particular seat or other location within vehicle 205 where the occupant is located. The position of the occupant includes the occupant's body orientation, the location of specific limbs, and/or other positional information. In one example, sensors 120 include an in-cabin facing camera, LIDAR, radar, weight sensors, accelerometer, gyroscope, compass and/or other types of sensors to identify the location and/or position of occupants within vehicle 205.

In the example embodiment, DS computing device 240 is remotely in communication with user computing device 110 and/or vehicle controller 230. In this configuration, DS computing device 240 stores in memory a plurality of user 210 profiles for registered users 210. DS computing device 240 operates in a client/server configuration and communicates with user computing device 110 and/or vehicle controller 230 using a network such as the Internet. User computing device 110 and/or vehicle controller 230 may periodically be in communication with DS computing device 240. Alternatively, user computing device 110 and/or vehicle controller 230 may be on continuous communication with DS computing device 240.

DS computing device 240 stores in memory a profile for user 210 associated with vehicle 205. In some embodiments, multiple users 210 register with DS system 400. In some embodiments, a user 210 registers with DS system 400 as a primary driver and other users 210 register as secondary drivers and/or as passengers.

In some embodiments, DS computing device 240 is implemented at least partially on vehicle 205. For example, at least some functionality of DS computing device 240 is installed as a module on vehicle controller 230. Alternatively, DS computing device 240 is implemented separately and remotely from vehicle 205 and communicates with vehicle controller 230 to, for example, receive data from sensors 120.

Vehicle controller 230 is also configured to communicate with user's 210 user computing device 110 and enable access to details of that communication to DS computing device 240. In the example embodiment, vehicle controller 230 wirelessly communicates with user computing device 110 in vehicle 205. In these embodiments, vehicle controller 230 is capable of communicating with user computing device 110 of a vehicle occupant, such as the driver, through an application on user computing device 110. In the example embodiment, upon detecting user 210 as the driver, vehicle 205, via vehicle controller 230, communicates with user computing device 110, for example, via the Internet, Bluetooth®, USB, OBDII port, or any other wired or wireless connection (e.g., Near Field Communication) over one or more radio links or wireless communication channels to automatically activate (e.g., launch, opens, initiate, execute, etc.) an application. For example, vehicle controller 230 activates an application that detects a state of user computing device 110 and/or switches user computing device 110 from an active state to an inactive state. In some embodiments, vehicle 205 includes "application pairing" functionality such that the driver engages with an application on a user interface in vehicle 205 while their user computing device 110 is in an inactive state. In other embodiments, vehicle 205 is in communication with one or more user computing devices 110 that are each associated with one or more vehicle occupants of vehicle 205.

Using the application pairing functionality, vehicle controller 230 determines which user computing device(s) 110 are within vehicle 205 during a trip. For example, each vehicle occupant may pair one or more user computing device 110 (e.g., smartphones, tablets, laptops, wearables, etc.) to vehicle 205. Vehicle 205 pairs with one or more user computing device 110 that are within vehicle 205 during a trip. DS computing device 240 records data received from vehicle controller 230 including which user computing device(s) 110 pair with vehicle 205 for a trip. Using the received biometric data from the biometric sensors, vehicle controller 230 confirms that the vehicle occupant associated with the paired user computing device 110 is the driver for the trip. Additionally or alternatively, DS computing device 240 is at least partially implemented on user computing device 110.

In some embodiments, vehicle 205 includes autonomous or semi-autonomous vehicle-related functionality or technology that are used with the present embodiments to replace human driver actions that include and/or are related to the following types of functionality: (a) fully autonomous (driverless) control; (b) partially autonomous/limited driver control; (c) vehicle-to-vehicle (V2V) wireless communication; (d) vehicle-to-infrastructure (and/or vice versa) wireless communication; (e) automatic or semi-automatic steering; (f) automatic or semi-automatic acceleration; (g) automatic or semi-automatic braking; (h) automatic or semi-automatic blind spot monitoring; (i) automatic or semi-automatic collision warning; (j) adaptive cruise control; (k) automatic or semi-automatic parking/parking assistance; (l) automatic or semi-automatic collision preparation (e.g., window closure, seat adjustments into upright positions, brake pre-charge, etc.); (m) driver acuity/alertness monitoring; (n) pedestrian detection; (o) autonomous or semi-autonomous backup systems; (p) road mapping systems; (q) software security and anti-hacking measures; (r) theft prevention/automatic return; (s) automatic or semi-automatic driving without occupants; and/or other functionality. In these embodiments, the autonomous or semi-autonomous vehicle-related functionality or technology are controlled, operated, and/or in communication with vehicle controller 230.

The wireless communication-based autonomous or semi-autonomous vehicle technology or functionality includes and/or is related to: automatic or semi-automatic steering; automatic or semi-automatic acceleration and/or braking; automatic or semi-automatic blind spot monitoring; automatic or semi-automatic collision warning; adaptive cruise control; and/or automatic or semi-automatic parking assistance. Additionally or alternatively, the autonomous or semi-autonomous technology or functionality includes and/or is related to: driver alertness or responsive monitoring; pedestrian detection; artificial intelligence and/or back-up systems; navigation or GPS-related systems; security and/or anti-hacking measures; and/or theft prevention systems. DS computing device 240 is configured to account for periods where the "driver" is not actively controlling the vehicle in evaluating whether the driver is distracted by use of user computing device 110.

In certain embodiments, in addition to biometric data, where vehicle 205 is an autonomous or semi-autonomous vehicle, vehicle controller 230 interprets sensor information from sensors 120 to determine usage of vehicle 205 by one or more users 210 (e.g., the driver) for each trip undertaken by vehicle 205. As used herein, "trip" refers to a discrete use of vehicle 205, from an initial starting point (e.g., starting vehicle 205) to an end point (e.g., reaching a destination or turning off vehicle 205). Accurately determining usage of vehicle 205 by the driver for a trip includes collecting and/or generating vehicle-based telematics data associated with the driver.

In further embodiments, DS computing device 240 interprets the sensor information to identify the driver in relation to other users 210 present in vehicle 205 as passengers. For example, DS computing device 240 determines positional information for at least one user 210 present in vehicle 205 during a trip. Positional information includes a position of user 210, a direction of facing of user 210, a size of user 210, and/or a skeletal positioning of user 210. The position of user 210 includes which seat user 210 occupies. The direction of facing of user 210 includes whether user 210 is facing forward, reaching forward, reaching to the side, and/or has his/her head turned. The size of user 210 may be used to determine whether user 210 is an adult or a child. The size of user 210 includes user 210's height. The skeletal positioning includes positioning of user 210's joints, spine, arms, legs, torso, neck face, head, major bones, hands, and/or feet.

In other embodiments, DS computing device 240 uses additional and/or alternative vehicle telematics data in addition to biometric data, such as sensor information from sensors within a paired user computing device 110, to verify which vehicle occupant is the driver when multiple user computing devices 110 pair with vehicle 205 during a single trip. In one example, DS computing device 240 uses gyroscope and/or accelerometer sensor information from the paired user computing device 110 to identify which side of vehicle 205 each occupant used to enter vehicle 205 and/or exit vehicle 205. In other words, vehicle controller 230 accesses and processes data from the gyroscope and/or accelerometer for each user computing device 110 to determine whether the user of the user computing device 110 entered vehicle 205 on the left (e.g., driver) or the right (e.g., passenger). If only two user computing devices 110 are present and DS computing device 240 determines that a first user computing device 110 is associated with the left side of vehicle 205 and a second user computing device 110 is associated with the right side of vehicle 205, DS computing device 240 records that the user associated with the first user computing device 110 is the driver and the user of the second user computing device 110 is a passenger for the trip. It should be understood that although the left side is associated with a "driver's side" and the right side is associated with a "passenger side" herein, as is the custom in the United States of America, this method is easily applied to other driving customs in which the left side is a passenger side and the right side is the driver's side.

While vehicle 205 may be an automobile in the example embodiment, in other embodiments, vehicle 205 may be, but is not limited to, other types of ground craft, aircraft, and watercraft vehicles.

Figure 3:
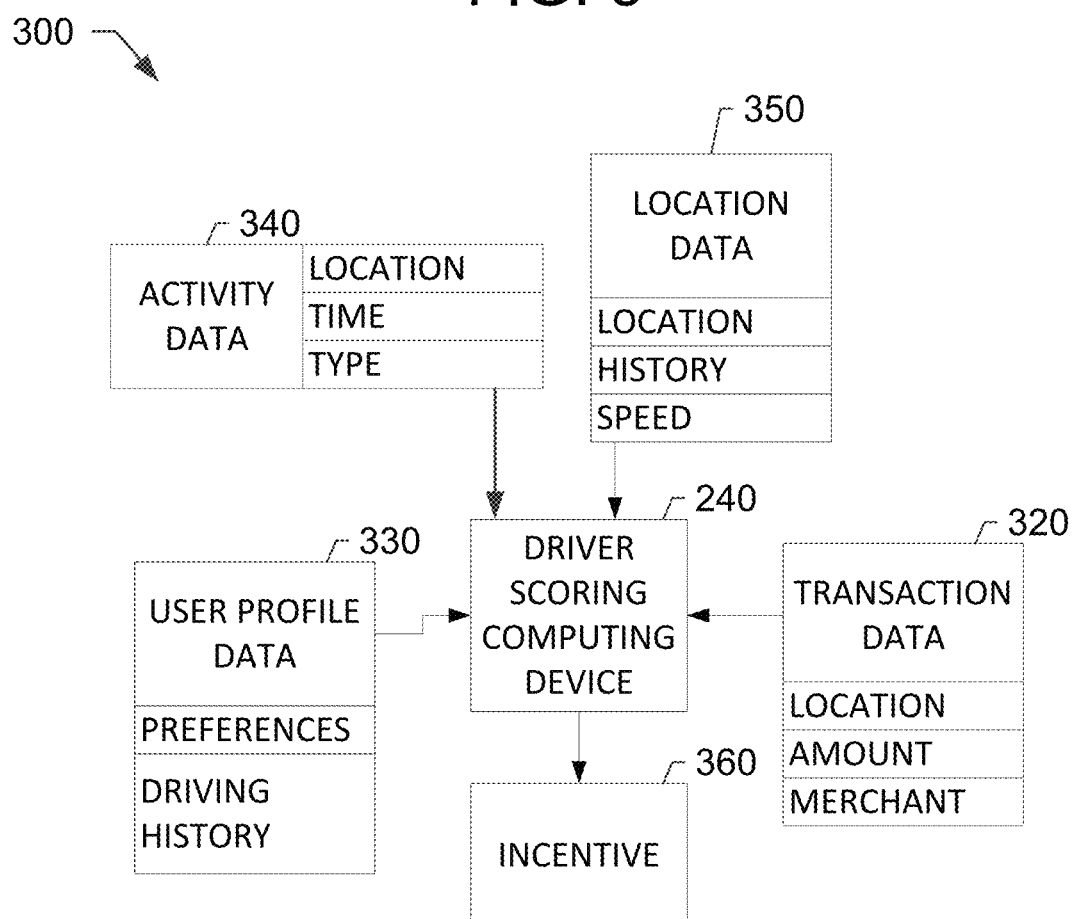

FIG. 3 is a simplified block diagram 300 of an example data conversion process using DS computing device 240 (shown in FIG. 2). DS computing device 240 generates a preferred incentive for a driver in accordance with one embodiment of the present disclosure. In the example embodiment, diagram 300 includes DS computing device 240, transaction data 320, user profile data 330, activity data 340, and location data 350. DS computing device 240 generates an incentive 360. In the example embodiment, transaction data 320 is received from payment processor 750 (shown in FIG. 4). Alternatively, transaction data 320 is received from other networks or from devices or systems communicatively coupled to DS computing device 240 (shown in FIG. 4).

In the example embodiment, transaction data 320 includes location information of the payment transaction, a dollar amount for the payment transaction, and merchant data associated with the payment transaction. In some embodiments, transaction data 320 also includes additional information such as an identifier of a product or service purchased and frequency of purchase. In the example embodiment, DS computing device 240 retrieves user profile data 330. User profile data 330 includes user preferences for certain types of purchases, and may be derived from a history of payment transactions, by the user of a particular merchant and/or at the same location or provided by user 210. In the example embodiment, DS computing device 240 retrieves location data 350 including the current location of vehicle 205. Location data 350 is cross-referenced with merchants that satisfy user's 210 user preferences and are located near vehicle 205 or in a projected path determined based on a history of locations and current speed of vehicle 205 received from DS computing device 240. In the example embodiment, DS computing device 240 retrieves activity data 340 associated with driving activity of the user. Activity data 340 includes the location information, a time period user 210 is engaged in the activity, and the type of activity. In the example embodiment, DS computing device 240 generates an incentive using the above described data sets to produce incentive 360, which is provided to the user by DS computing device 240.

FIG. 4 is a simplified block diagram of an example embodiment of a driver scoring (DS) computer system 400 using driver scoring (DS) computing device 240 used for providing incentives to drivers to improve safe driving behavior. In the example embodiment, DS computing device 240 is used to detect and categorize activity on user computing device 110. In the example embodiment, a payment processing system 750 is in communication with DS computing device 240. DS computing device 240 is configured to receive past payment transaction information of user 210 and analyze driver activity to generate incentives. As described below in more detail, DS computing device 240 is configured to store a plurality of user preferences in a user profile associated with a user account in database 470; receive driver activity data from a plurality of sensors 120 of vehicle 205 (shown in FIG. 1); determine, using the sensor data received from sensor 120, a driver activity; calculate a score for the driver activity; retrieve the driver profile from database 470; and generate at least one merchant incentive based on the score and the driver profile. DS computing device 240 may be in direct communication with sensors 120, such as via installation of at least some portion of DS computing device 240 on vehicle controller 230, or may receive sensor data indirectly through transmissions from vehicle controller 230.

In the example embodiment, user computing device 110 is communicatively coupled to the Internet through many interfaces including, but not limited to, at least one of a network, such as a local area network (LAN), a wide area network (WAN), or an integrated services digital network (ISDN), a dial-up-connection, a digital subscriber line (DSL), a cellular phone connection, and a cable modem. User computing device 110 can be any device capable of accessing the Internet including, but not limited to, a desktop computer, a laptop computer, a personal digital assistant (PDA), a cellular phone, a smartphone, a tablet, a phablet, or other web-based connectable equipment. In the example embodiment, user 210 registers for incentives using DS computer system 400, to register a vehicle, register user computing device 110, set preferences for incentives, and set preferences for preferred methods of communication. DS computing device 240 may be in direct communication with user computing device 110, or may communicate indirectly with user computing device 110 through vehicle controller 230.

DS computing device includes a database server 460 communicatively coupled to a database 470 that stores data. In one embodiment, database 470 includes at least user preferences, activity data, and merchant offers. In the example embodiment, database 470 is stored remotely from DS computing device 240. In some embodiments, database 470 is decentralized. In the example embodiment, user 210 can access database 470 via user computing device 110, by logging onto DS computing device 240 to configure preferences and register additional user computing devices 110, as described herein.

Figure 7:
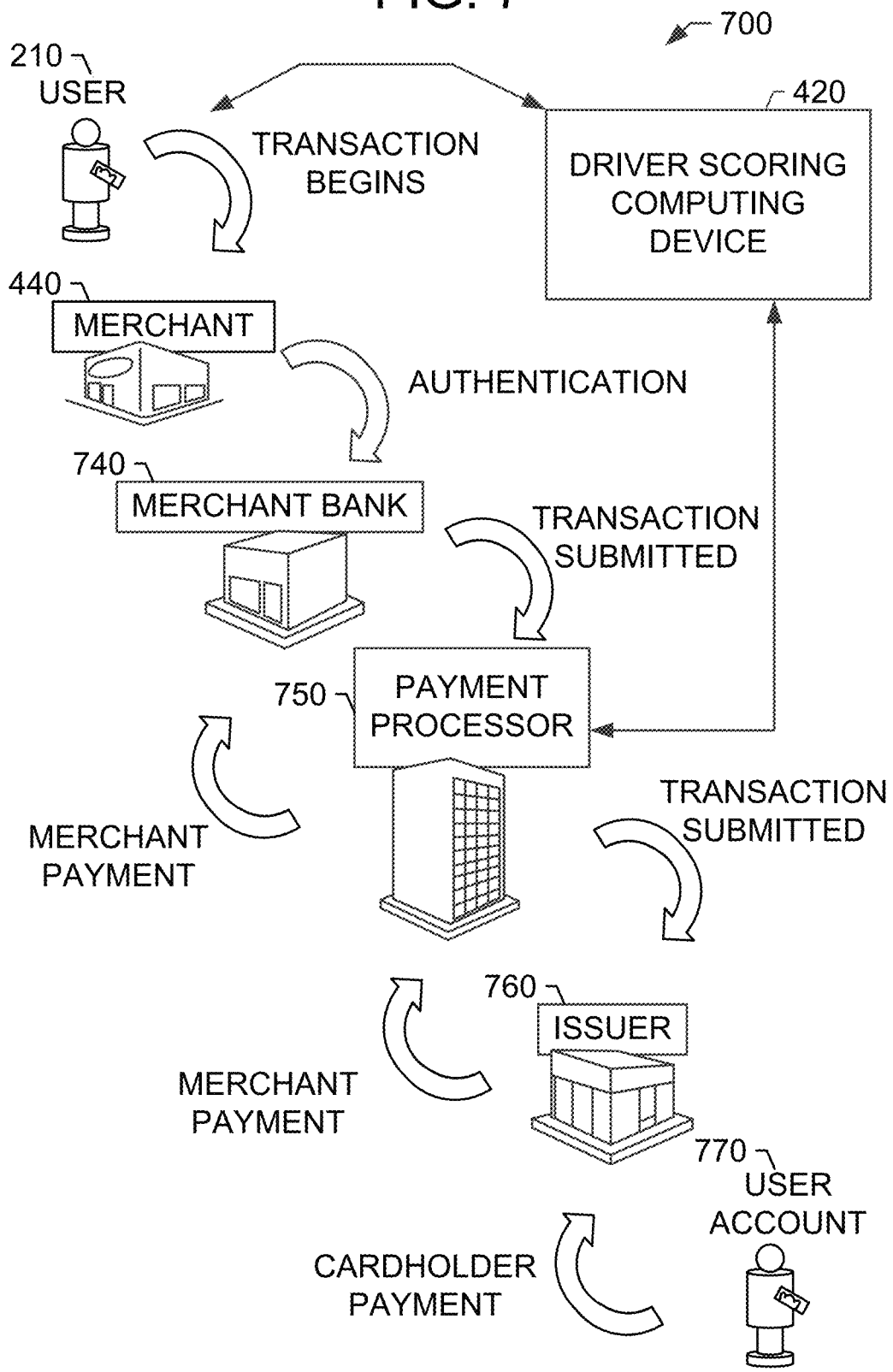

DS computing device 240 is communicatively coupled with payment processor 750 (shown in FIG. 7). Payment processor 750 represents one or more parts of multi-party payment card processing system 700 (shown in FIG. 7). In the example embodiment, DS computing device 240 is in communication with one or more computer devices associated with payment processor 750. In other embodiments, DS computing device 240 is in communication with one or more computer devices associated with merchant 440, merchant bank 740 (shown in FIG. 7), or issuer bank 760 (also shown in FIG. 1). In some embodiments, DS computing device 240 is associated with, or is part of payment system 700, or in communication with payment system 700. In other embodiments, DS computing device 240 is associated with a third party and is in communication with payment system 700. In some embodiments, DS computing device 240 is associated with, or is a part of merchant bank 740, payment processor 750, or issuer bank 760. In addition, DS computing device 240 is communicatively coupled with merchant 440. In the example embodiment, DS computing device 240 is in communication with merchant 440 via Application Programming Interface (API) calls. Through the API call, merchant 440 transmits information to and receives information from DS computing device 240.

In the example embodiment, DS computing device 240 is associated with payment processor 750 and is configured to provide customized incentives in the form of rewards points, discounts, or other offers. When a user, such as user 210, enrolls in DS computer system 400, user 210 provides one or more incentive preferences (e.g., scores, rankings, rewards points, gift cards, airline miles, etc.) and account information for one or more user accounts 770 of the user 210 to DS computing device 240. The preferences and account information are stored by DS computing device 240 in database 470 as user preferences in a user profile. The user preferences are rule-based preferences that define steps to be taken for determining incentives for the user. In the example embodiment, user 210 may customize his or her profile. For example, the user 210 specifies a preferred category of incentives (rewards points, airline miles, etc.). User 210 further specifies particular merchants or particular products or services. For example, if user 210 prefers beverage-based rewards or airline miles from specific airlines, DS computing device 240 stores in database 470 the preferences. In the example embodiment, user 210 logs in to DS computing device 240, such as using user computing device 110, to update or change preferences.

In some embodiments, DS computing device 240 is associated with the financial transaction payment processor 750 and is referred to as an interchange computer system. DS computing device 240 is used for processing transaction data from payment processor 750 and analyzing the data to determine preferred incentive for user 210. For example, the transaction data relates to purchases user 210 makes utilizing a transaction card processed by payment processor 750 and issued by an associated issuer 760. At least one user computing device 110 is associated with user 210 seeking to register, access information, or receive incentives from merchant 440. Furthermore, user computing device 110 or another user device is used to access user accounts online, such as through e-commerce gateways for merchants 440 that have registered with DS computing system 400. In this manner, incentives in the form of rewards points are redeemed through the merchant website 430.

Figure 5:
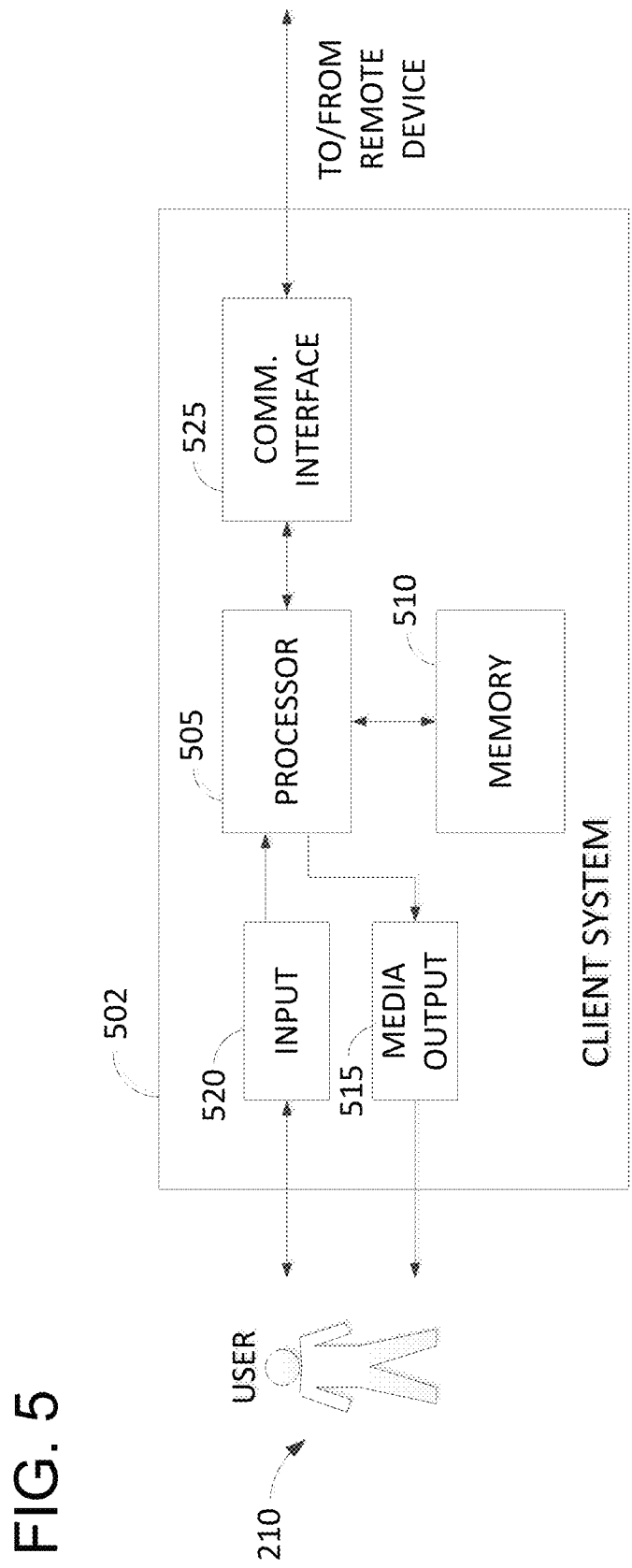

FIG. 5 illustrates an example configuration of a client system 502 in accordance with one embodiment, of the present disclosure. In the example embodiment, client system 502 is user computing device 110 (shown in FIG. 1). In other embodiments, client system 502 may be a merchant computing device operating website 430 (shown in FIG. 4), a POS system, or another user computing device. In the example embodiment, client system 502 is operated by user 210 (shown in FIG. 2). Alternatively, client system 502 is operated by merchant 440. Client system 502 includes, but is not limited to, user computing device 110, computer devices associated with merchant 440 (shown in FIG. 4), and computer devices associated with user 210 (shown in FIG. 2). Client system 502 includes a processor 505 for executing instructions. In some embodiments, executable instructions are stored in a memory area 510. Processor 505 includes one or more processing units (e.g., in a multi-core configuration). Memory area 510 is any device allowing information such as executable instructions and/or transaction data to be stored and retrieved. Memory area 510 may include one or more computer-readable media.

Client system 502 also includes at least one media output component 515 for presenting information to user 210. Media output component 515 is any component capable of conveying information to user 210. In some embodiments, media output component 515 includes an output adapter (not shown) such as a video adapter and/or an audio adapter. An output adapter is operatively coupled to processor 505 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 515 is configured to present a graphical user interface (e.g., a web browser and/or a client application) to user 210. A graphical user interface includes, for example, an online store interface for viewing and/or purchasing items, and/or a wallet application for managing payment information. In some embodiments, client system 502 includes an input device 520 for receiving input from user 210. User 210 may use input device 520 to, without limitation, select and/or enter one or more items to purchase and/or a purchase request, or to access credential information, and/or payment information. Input device 520 includes, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen functions as both an output device of media output component 515 and input device 520.

Client system 502 also includes a communication interface 525, communicatively coupled to a remote device such as driver scoring computing (AA) device 110 (shown in FIG. 2). Communication interface 525 includes, for example, a wired or wireless network adapter and/or a wireless data transceiver for use with a mobile telecommunications network.

Stored in memory area 510 are, for example, computer-readable instructions for providing a user interface to user 210 via media output component 515 and, optionally, receiving and processing input from input device 520. The user interface includes, among other possibilities, a web browser and/or a client application. Web browsers enable users, such as user 210, to display and interact with media and other information typically embedded on a web page or website hosted by DS computing device 240. A client application allows user 210 to interact with, for example, DS computing device 240. For example, instructions may be stored by a cloud service and the output of the execution of the instructions sent to the media output component 515.

Figure 6:
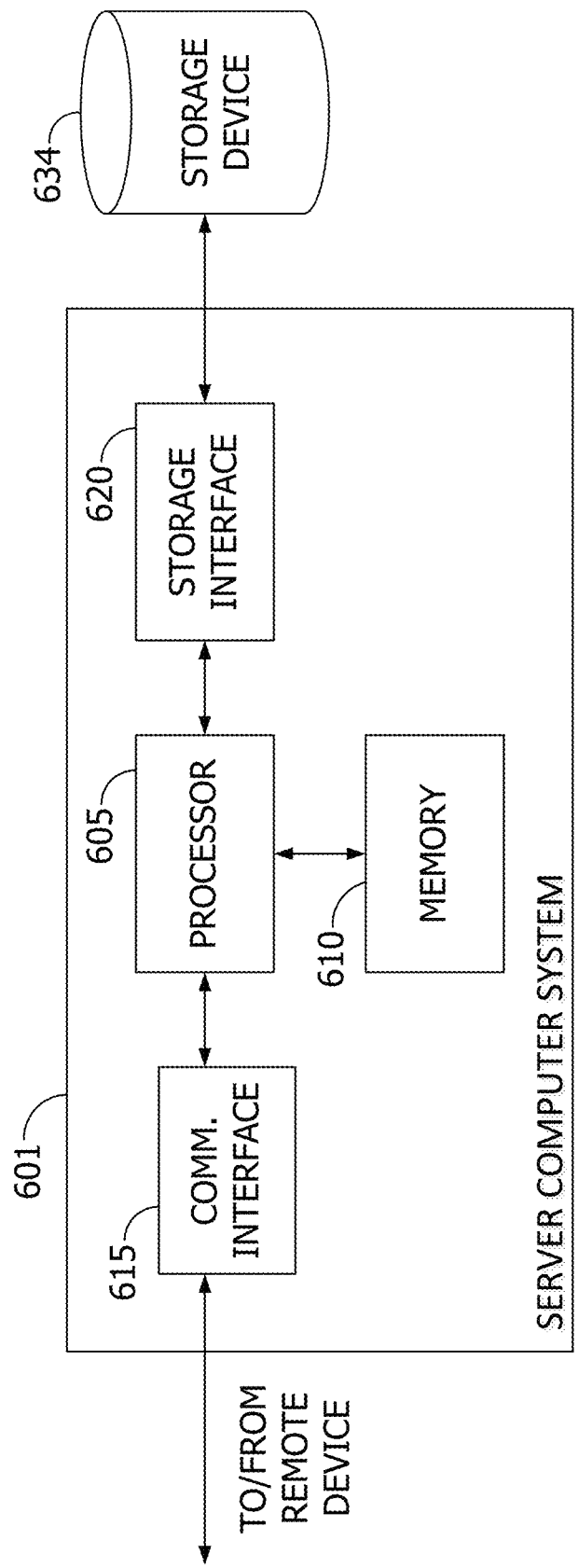

FIG. 6 illustrates an example configuration of a server system 601, in accordance with one embodiment of the present disclosure. Server computer system 601 may be used to implement, but is not limited to, database server 460 (shown in FIG. 4), merchant 440 (shown in FIG. 4), and DS computing device 240 (shown in FIG. 1). Server computer system 601 includes a processor 605 for executing instructions. Instructions may be stored in a memory area 610. Processor 605 may include one or more processing units (e.g., in a multi-core configuration).

Processor 605 is operatively coupled to a communication interface 615 such that server computer device 601 is capable of communicating with a remote device such as another server computer device 601, vehicle sensors 120, vehicle controller 230, user computing device 110, database 470, merchant 440, or DS computing device 240. For example, communication interface 615 receives requests from user computing device 110 via the Internet.

Processor 605 may also be operatively coupled to a storage device 634. Storage device 634 is any computer-operated hardware suitable for storing and/or retrieving data, such as, but not limited to, data associated with database 470. In some embodiments, storage device 634 is integrated in server computer device 601. For example, server computer device 601 may include one or more hard disk drives as storage device 634. In other embodiments, storage device 634 is external to server computer device 601 and may be accessed by a plurality of server computer devices 601. For example, storage device 634 may include a storage area network (SAN), a network attached storage (NAS) system, and/or multiple storage units such as hard disks and/or solid state disks in a redundant array of inexpensive disks (RAID) configuration.

In some embodiments, processor 605 is operatively coupled to storage device 634 via a storage interface 620. Storage interface 620 is any component capable of providing processor 605 with access to storage device 634. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 634.

Processor 605 executes computer-executable instructions for implementing aspects of the disclosure. In some embodiments, processor 605 is transformed into a special purpose microprocessor by executing computer-executable instructions or by otherwise being programmed. For example, processor 605 is programmed with the instructions such as those illustrated in FIG. 8.

FIG. 7 is a schematic diagram illustrating an example multi-party payment card processing system 700 for enabling payment transactions between merchants 440, users 210, and issuer banks 760. Embodiments described herein may relate to a transaction card system, such as a credit card payment system using MASTERCARD® interchange network. The MASTERCARD® interchange network is a set of proprietary communications standards promulgated by Mastercard International Incorporated for the exchange of financial transaction data and the settlement of funds between financial institutions that are members of Mastercard International Incorporated. (MASTERCARD® is a registered trademark of Mastercard International Incorporated located in Purchase, New York).

In the payment card processing system, a financial institution called the "issuer" 760 issues a transaction card or electronic payments account identifier, such as a credit card, to user 210, who uses the transaction card to tender payment for a purchase from a merchant 440. To accept payment with the transaction card, merchant 440 must establish an account with a financial institution that is part of the financial payment system. This financial institution is called the "merchant bank," the "acquiring bank," or the "acquirer" 740. User 210 tenders payment for a purchase with a transaction card and merchant 440 requests authorization from a merchant bank 740 for the amount of the purchase. The request may be performed over the telephone, but is usually performed through the use of a point-of-sale terminal, which reads user's 210 account information from a magnetic stripe, a chip, or embossed characters on the transaction card and communicates electronically with the transaction processing computers of merchant bank 740. Alternatively, merchant bank 740 may authorize a third party to perform transaction processing on its behalf. Alternatively, the point-of-sale terminal will be configured to communicate with the third party. Such a third party is usually called the "payment processor," the "acquiring processor," or the "third party processor."

Using an interchange network, computers of merchant bank 740 or payment processor 750 communicate with DS computing device 240 to provide historical transaction data of user 210 if user 210 has been registered with the DS computing device 240 to receive incentives. Additionally or alternatively, DS computing device 240 may communicate with issuer 760 to notify issuer 760 that user 210 has registered for incentives. In the example embodiment, DS computing device 240 communicates with database 470 to retrieve user 210 profile data, historical activity data, and merchant data to generate preferred incentives.

When a request for authorization is accepted, the available credit line of user account 770 is decreased. A charge for a payment card transaction may not be posted immediately to user's 210 account 770 because bankcard associations, such as Mastercard International Incorporated, have promulgated rules that do not allow merchant 440 to charge, or "capture," a transaction until goods are shipped or services are delivered. However, with respect to at least some debit card transactions, a charge may be posted at the time of the transaction. When merchant 440 ships or delivers the goods or services, merchant 440 captures the transaction by, for example, appropriate data entry procedures on the point-of-sale terminal. This may include bundling of approved transactions daily for standard retail purchases. If user 210 cancels a transaction before it is captured, a "void" is generated. If user 210 returns goods after the transaction has been captured, a "credit" is generated.

After a purchase has been made, a clearing process occurs to transfer additional transaction data related to the purchase among the parties to the transaction, such as merchant bank 740, payment processor 750, and issuer 760. More specifically, during and/or after the clearing process, additional data, such as a time of purchase, a merchant name, a type of merchant, purchase information, user account information, a type of transaction, itinerary information, information regarding the purchased item and/or service, and/or other suitable information, is associated with a transaction and transmitted between parties to the transaction as transaction data, and may be stored by any of the parties to the transaction. In an example embodiment, when user 210 engages in a transaction, at least partial transaction information (e.g., location, past visits, transaction amount, etc.) is transmitted during the clearance process as transaction data. When payment processor 750 receives the information, payment processor 750 routes the relevant information to DS computing device 240.

After a transaction is authorized and cleared, the transaction is settled among merchant 440, merchant bank 740, and issuer 760. Settlement refers to the transfer of financial data or funds among merchant's 440 account, merchant bank 740, and issuer 760 related to the transaction. In some embodiments, the transactions are captured and accumulated into a "batch," which is settled as a group. More specifically, a transaction is settled between issuer 760 and payment processor 750, and then between payment processor 750 and merchant bank 740, and then between merchant bank 740 and merchant 440.

In some embodiments, user 210 registers one or more payment cards with a digital wallet such as APPLE PAY™, or MASTERPASS™. Having done this, user 210 can interact with a participating merchant 440. At the check-out stage, merchant 440 displays a button on merchant website 430 which user 210 can click on in order to make a payment using the user's digital wallet. Merchant 440 then redirects the user to a "switch" operated by payment processor 750. Using a cookie located on the user's computer, the "switch" is able to determine which wallet-hosting server hosts a wallet associated with user 210. The switch then establishes a connection between the user's computer and the appropriate wallet-hosting system, which presents user 210 with a sign-in page (e.g., as a pop-up window), where there is an authentication process (e.g., entry of a pre-agreed password). This log-in process may use the same login credentials (e.g., password) which the user also uses to obtain access to other online banking activities.

The wallet-hosting system then securely transfers the user's payment information to the online merchant's domain. The merchant's domain submits the user's payment information to merchant bank 740 for a separate authorization process in which the acquiring domain communicates with issuer 760 to ask the bank to authorize the transaction. Issuer 760 may then communicate with DS computing device 240 to record the transaction for use as a potential incentive at a future time. Thus, user 210 is not required to enter card details (except at the stage of initially registering with the wallet-hosting system), and the online transaction process is streamlined with appropriate security verification while maintaining only a single redirection, and consistent branding for the entire payment process, irrespective of merchant 440, payment processor 750, merchant bank 740, or issuer 760.

In some embodiments, a unique identifier is provided to user 210. The unique identifier is different from the cardholder's account number. In these embodiments, payment processor 750 stores the unique identifier associated with user account 770. When payment processor 750 receives the unique identifier in a transaction, payment processor 750 determines the associated user account 770 and transmits the appropriate information to DS computing device 240 to record the payment transaction. In some embodiments, DS computing device 240 may be configured to process the payment transaction and deduct payment amounts according to redeemed incentives described above.

Figure 8:
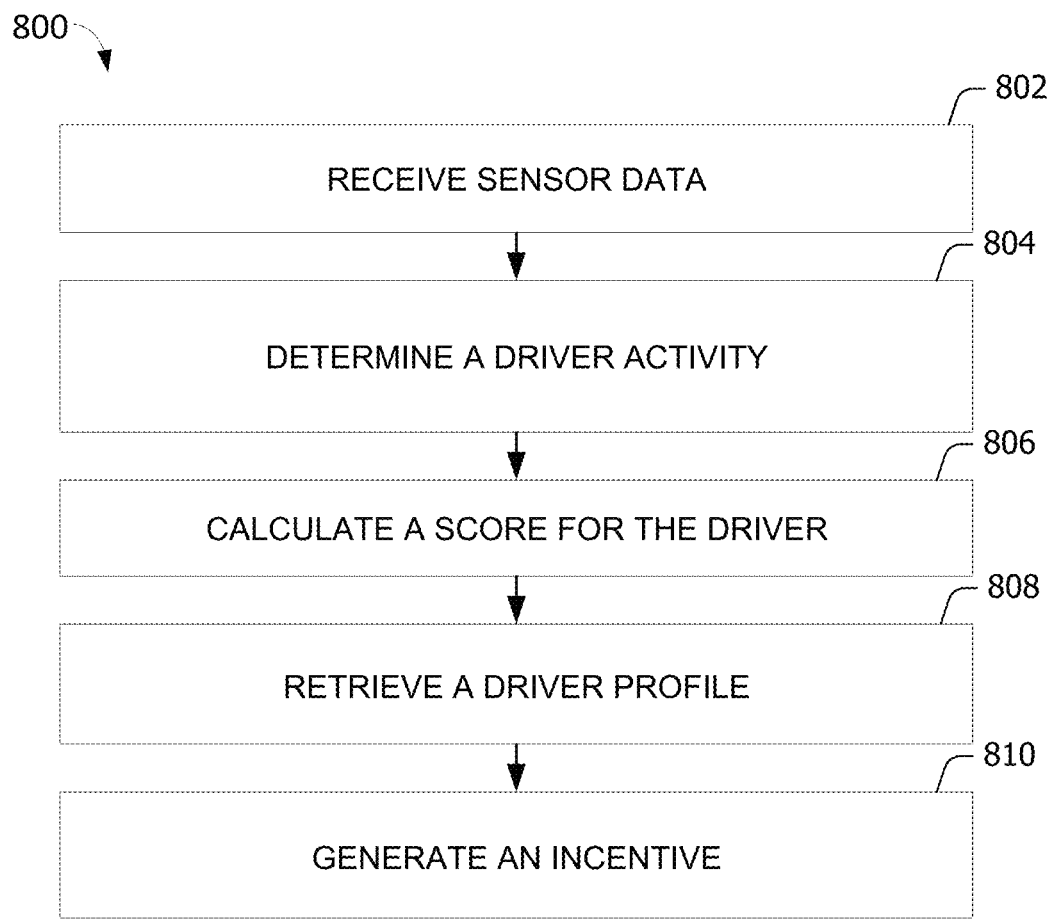

FIG. 8 illustrates a flow chart of an example method 800 of detecting driver activity and determining a preferred incentive for improving safe driving behavior in accordance with one embodiment of the present disclosure. In the example embodiment, method 800 is implemented by a driver scoring (DS) computer system 400 comprising a DS computing device 240 (both shown in FIG. 4), sensors 120 (shown in FIG. 1), and a user computing device 110 (shown in FIG. 1). Method 800 is further implemented on a vehicle 205 (shown in FIG. 2).

In the example embodiment, method 800 includes receiving 802 sensor data. The sensor data is retrieved from a plurality of sensors 120 associated with vehicle 205. Method 800 includes determining 804 a driver activity. The determination is based on data received from sensors 120. Using the driver activity, a score for the driver is calculated 806. Method 800 includes retrieving 808 a driver profile associated with the driver of vehicle 205. Using the score and the driver profile, an incentive is generated 810 for the driver.

Figure 9:
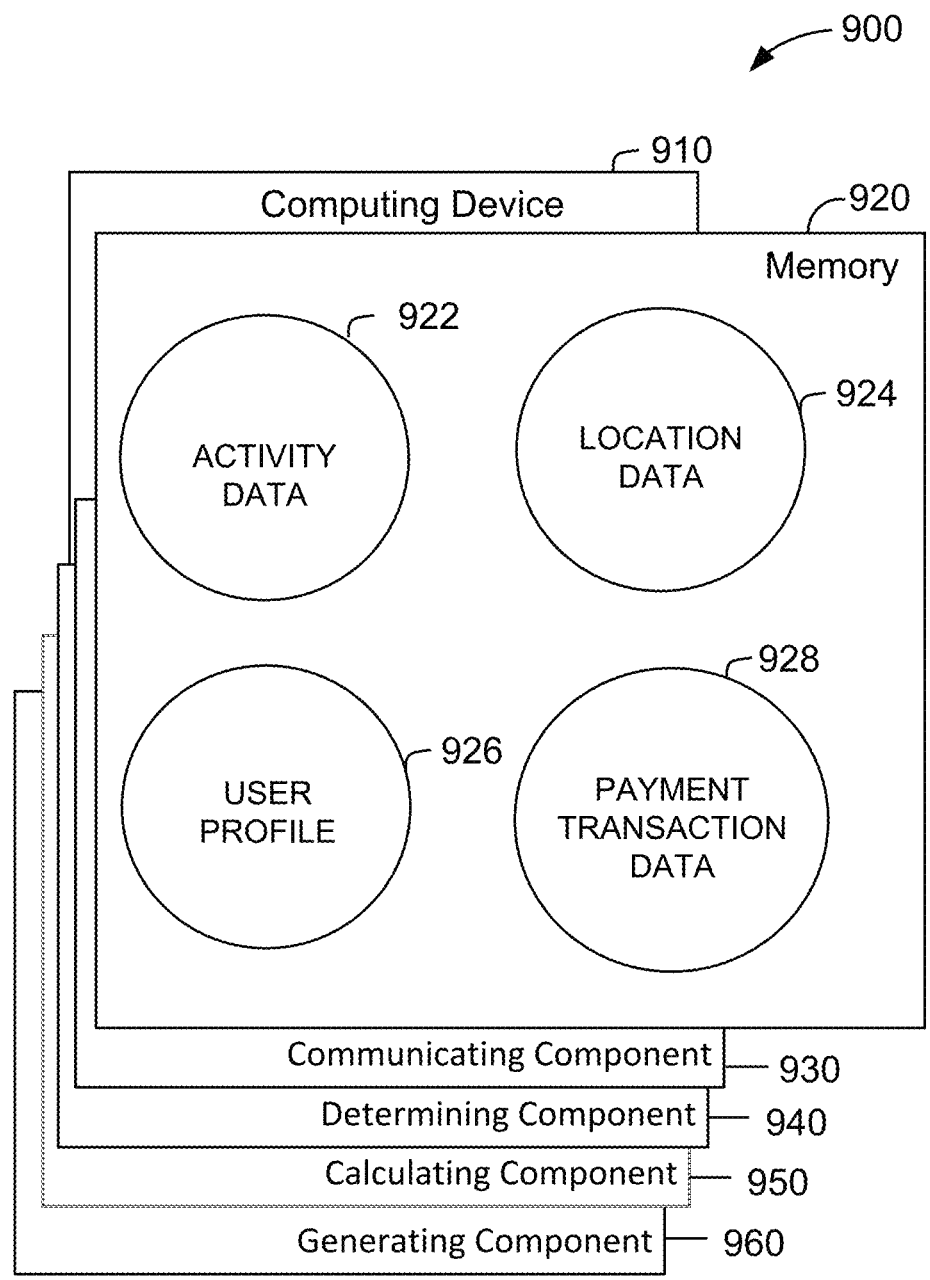

FIG. 9 depicts a diagram 900 of components of one or more example computing devices 910 that used in a driver scoring (DS) computer system 400 shown in FIG. 4. In some embodiments, computing device 910 may be similar to DS computing device 240 (shown in FIG. 4). A memory component 920 is coupled with several separate components within computing device 910, which performs specific tasks. In the example embodiment, memory 920 includes activity data 922 associated with a registered user 210 (shown in FIG. 2), location data 924 indicating the current location of a registered vehicle 205 (shown in FIG. 2), a user profile 926 associated with user 210, and payment transaction data 928 associated with user 210.

Computing device 910 also includes communicating component 930 for receiving activity data 922 from sensors 120 (shown in FIG. 1), receiving location data 924 from GPS systems, and payment transaction data 928 from a payment processor 750 (shown in FIG. 7). In some embodiments, communicating component 930 also receives user profile data 926 from remote storage devices. Computing device 910 also includes a determining component 940 for determining driver activities based on sensor data. Computing device 910 also includes a calculating component 950 to calculate a score using detected activity. Computing device 910 further includes a generating component 960 to generate a preferred incentive.

In addition, although various elements of the computer system are described herein as including general processing and memory devices, it should be understood that the computer system is a specialized computer configured to perform the steps described herein for facilitating real time communication across different networks to update user computing devices to display user spending limits.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A driver scoring (DS) computing device for implementing a driver safety incentive program, the DS computing device including at least one processor in communication with at least one memory, the at least one processor configured to:
    store a merchant profile for each merchant of a plurality of merchants within the at least one memory, wherein the merchant profiles include one or more merchant incentives being offered by each merchant;
    store a driver profile associated with a driver of a vehicle within the at least one memory, wherein the stored driver profile includes data received from a vehicle controller of the vehicle, a payment processor configured to authorize payment transactions and settle funds between financial institutions that are members of an interchange network, and a user computing device associated with the driver;
    associate a payment account ID with the stored driver profile, wherein the payment account ID corresponds to a payment account of the driver;
    communicate with the vehicle controller, the payment processor, and the user computing device;
    activate an application on the user computing device, wherein the application is configured to monitor usage of the user computing device while the user computing device is inside the vehicle;
    receive, from the vehicle controller, sensor data generated by a plurality of sensors during usage of the vehicle throughout a trip of the vehicle, the plurality of sensors coupled to the vehicle and in communication with the vehicle controller;
    identify, based on the sensor data, the driver of the vehicle;
    receive, from the application on the user computing device, usage data reporting the monitored usage of the user computing device throughout the trip;
    determine, based on the usage data, that a state of the user computing device is one of active or inactive at a plurality of times throughout the trip;
    identify, based on the sensor data, an end of the trip;
    in response to identifying the end of the trip, calculate a score based on the state of the user computing device at the plurality of times throughout the trip;
    using the payment account ID associated with the stored driver profile, retrieve historical payment transaction data of the identified driver and the associated payment account ID from the payment processor, wherein the historical payment transaction data is associated with the payment transactions initiated by the identified driver and processed by the payment processor, and wherein the historical payment transaction data includes merchant identifiers corresponding to the plurality of merchants;
    analyze the historical payment transaction data and user input preferences to generate a list of preferred merchants for the driver, the list of preferred merchants including at least one merchant recently transacted with by the driver and associated with one of the merchant identifiers included in the historical payment transaction data received from the payment processor;
    store the list of preferred merchants for the driver in the at least one memory;
    compare the list of preferred merchants for the driver to the merchant profiles to identify a selected merchant from the list of preferred merchants stored in the at least one memory for providing the one or more merchant incentives to the driver;
    input into an incentive model the score calculated for the driver, the selected merchant, and the historical payment transaction data to identify a selected incentive of the one or more merchant incentives offered by the selected merchant to be provided to the driver for the score achieved by the driver; and
    in response to identifying the selected incentive, cause the application on the user computing device to notify the driver of the vehicle of the selected incentive to be provided to the driver by the selected merchant.

2. The DS computing device of claim 1, wherein the at least one processor is further configured to:
    generate the incentive model based on the historical payment transaction data; and
    execute the incentive model to identify the selected incentive for the driver.

3. The DS computing device of claim 1, wherein the at least one processor is further configured to (i) receive a current location for the driver, (ii) determine registered merchants near the current location, and (iii) identify an additional selected incentive using the stored driver profile, the list of preferred merchants, and the registered merchants near the current location.

4. The DS computing device of claim 1, wherein the at least one processor is further configured to store in the stored driver profile at least one of a user computing device identifier associated with the user computing device, a vehicle identifier associated with the vehicle, or a merchant incentive preference.

5. The DS computing device of claim 1, wherein the at least one processor is further configured to update the stored driver profile with at least one of new payment transactions, new user-input preferences, or redeemed merchant incentives.

6. The DS computing device of claim 1, wherein the sensor data is received from the plurality of sensors including at least one of a biometric sensor, an infrared sensor, a camera, a wireless transmitter, a laser sensor, a microwave sensor, or a mass sensor.

7. The DS computing device of claim 1, wherein the usage data further includes at least one of texting, talking, reading, using the user computing device, accessing the Internet, recording audio, recording video, and taking photographs, and wherein it is determined, from the sensor data, that the trip of the vehicle has ended when the vehicle is turned off.

8. A computer-implemented method for implementing a driver safety incentive program, the method executed by a driver scoring (DS) computing device that includes at least one processor in communication with at least one memory, the method comprising:

storing a merchant profile for each merchant of a plurality of merchants within the at least one memory, wherein the merchant profiles include one or more merchant incentives being offered by each merchant;

storing a driver profile associated with a driver of a vehicle within the at least one memory, wherein the stored driver profile includes data received from a vehicle controller of the vehicle, a payment processor configured to authorize payment transactions and settle funds between financial institutions that are members of an interchange network, and a user computing device associated with the driver;

associating a payment account ID with the stored driver profile, wherein the payment account ID corresponds to a payment account of the driver;

communicating with the vehicle controller the payment processor, and the user computing device;

activating an application on the user computing device, wherein the application is configured to monitor usage of the user computing device while the user computing device is inside the vehicle;

receiving, from the vehicle controller, sensor data generated by a plurality of sensors during usage of the vehicle throughout a trip of the vehicle, the plurality of sensors coupled to the vehicle and in communication with the vehicle controller;

identifying, based on the sensor data, the driver of the vehicle;

receiving, from the application on the user computing device, usage data reporting the monitored usage of the user computing device throughout the trip;

determining, based on the usage data, that a state of the user computing device is one of active or inactive at a plurality of times throughout the trip;

identifying, based on the sensor data, an end of the trip;

in response to identifying the end of the trip, calculating a score based on the state of the user computing device at the plurality of times throughout the trip;

using the payment account ID associated with the stored driver profile, retrieving historical payment transaction data of the identified driver and the associated payment account ID from the payment processor, wherein the historical payment transaction data is associated with the payment transactions initiated by the identified driver and processed by the payment processor, and wherein the historical payment transaction data includes merchant identifiers corresponding to the plurality of merchants;

analyzing the historical payment transaction data and user input preferences to generate a list of preferred merchants for the driver, the list of preferred merchants including at least one merchant recently transacted with by the driver and associated with one of the merchant identifiers included in the historical payment transaction data received from the payment processor;

storing the list of preferred merchants for the driver in the at least one memory;

comparing the list of preferred merchants for the driver to the merchant profiles to identify a selected merchant from the list of preferred merchants stored in the at least one memory for providing the one or more merchant incentives to the driver;

inputting into an incentive model the score calculated for the driver, the selected merchant, and the historical payment transaction data to identify a selected incentive of the one or more merchant incentives offered by the selected merchant to be provided to the driver for the score achieved by the driver; and in response to identifying the selected incentive, causing the application on the user computing device to notify the driver of the vehicle of the selected incentive to be provided to the driver by the selected merchant.

9. The computer-implemented method of claim 8 further comprising:

generating the incentive model based on the historical payment transaction data; and executing the incentive model to identify the selected incentive for the driver.

10. The computer-implemented method of claim 8 further comprising (i) receiving a current location for the driver, (ii) determining registered merchants near the current location, and (iii) identifying an additional selected incentive using the stored driver profile, the list of preferred merchants, and the registered merchants near the current location.

11. The computer-implemented method of claim 8 further comprising storing in the stored driver profile at least one of a user computing device identifier associated with the user computing device, a vehicle identifier associated with the vehicle, or a merchant incentive preference.

12. At least one non-transitory computer-readable storage medium having computer-executable instructions for implementing a driver safety incentive program embodied thereon, wherein when executed by a driver scoring (DS) computing device including at least one processor in communication with at least one memory, the computer-executable instructions cause the at least one processor to:

store a merchant profile for each merchant of a plurality of merchants within the at least one memory, wherein the merchant profiles include one or more merchant incentives being offered by each merchant;

store a driver profile associated with a driver of a vehicle within the at least one memory, wherein the stored driver profile includes data received from a vehicle controller of the vehicle, a payment processor configured to authorize payment transactions and settle funds between financial institutions that are members of an interchange network, and a user computing device associated with the driver;

associate a payment account ID with the stored driver profile, wherein the payment account ID corresponds to a payment account of the driver;

communicate with the vehicle controller, the payment processor, and the user computing device;

activate an application on the user computing device, wherein the application is configured to monitor usage of the user computing device while the user computing device is inside the vehicle;

receive, from the vehicle controller, sensor data generated by a plurality of sensors during usage of the vehicle throughout a trip of the vehicle, the plurality of sensors coupled to the vehicle and in communication with the vehicle controller;

identify, based on the sensor data, the driver of the vehicle;

receive, from the application on the user computing device, usage data reporting the monitored usage of the user computing device throughout the trip;

determine, based on the usage data, that a state of the user computing device is one of active or inactive at a plurality of times throughout the trip;

identify, based on the sensor data, an end of the trip;

in response to identifying the end of the trip, calculate a score based on the state of the user computing device at the plurality of times throughout the trip;

using the payment account ID associated with the stored driver profile, retrieve historical payment transaction data of the identified driver and the associated payment account ID from the payment processor, wherein the historical payment transaction data is associated with the payment transactions initiated by the identified driver and processed by the payment processor, and wherein the historical payment transaction data includes merchant identifiers corresponding to the plurality of merchants;

analyze the historical payment transaction data and user input preferences to generate a list of preferred merchants for the driver, the list of preferred merchants including at least one merchant recently transacted with by the driver and associated with one of the merchant identifiers included in the historical payment transaction data received from the payment processor;

store the list of preferred merchants for the driver in the at least one memory;

compare the list of preferred merchants for the driver to the merchant profiles to identify a selected merchant from the list of preferred merchants stored in the at least one memory for providing the one or more merchant incentives to the driver;

input into an incentive model the score calculated for the driver, the selected merchant, and the historical payment transaction data to identify a selected incentive of the one or more merchant incentives offered by the selected merchant to be provided to the driver for the score achieved by the driver; and in response to identifying the selected incentive, cause the application on the user computing device to notify the driver of the vehicle of the selected incentive to be provided to the driver by the selected merchant.

13. The at least one non-transitory computer-readable storage medium of claim 12, wherein the computer-executable instructions further cause the at least one processor to determine whether the driver of the vehicle is registered for the driver safety incentive program.

14. The at least one non-transitory computer-readable storage medium of claim 12, wherein the computer-executable instructions further cause the at least one processor to:
generate the incentive model based on the historical payment transaction data; and
execute the incentive model to identify the selected incentive for the driver.

15. The at least one non-transitory computer-readable storage medium of claim 12, wherein the computer-executable instructions further cause the at least one processor to store in the stored driver profile at least one of a user computing device identifier associated with the user computing device, a vehicle identifier associated with the vehicle, or a merchant incentive preference.

16. The at least one non-transitory computer-readable storage medium of claim 12, wherein the computer-executable instructions further cause the at least one processor to (i) receive a current location for the driver, (ii) determine registered merchants near the current location, and (iii) identify an additional selected incentive using the stored driver profile, the list of preferred merchants, and the registered merchants near the current location.

17. The DS computing device of claim 1, wherein the at least one processor is further configured to (i) receive a current location for the driver, (ii) determine a nearby merchant from the list of preferred merchants for the driver near the current location of the driver, (iii) transmit the score of the driver and a driver identifier to the nearby merchant with a request for the nearby merchant to provide an additional selected incentive; and (iv) transmit the additional selected incentive provided by the nearby merchant to the driver.

18. The DS computing device of claim 1, wherein the at least one processor is further configured to transmit to the driver an electronic gift card associated with the selected merchant, and wherein the electronic gift card includes a value for spending at the identified merchant by processing the electronic gift card over the interchange network.

19. The DS computing device of claim 1, wherein the at least one processor is further configured to notify the driver of the vehicle of the selected incentive by causing an audible message to be communicated to the driver through a speaker of the vehicle or the user computing device, and wherein the audible message includes a location of the selected merchant providing the selected incentive relative to a current location of the vehicle or the driver.

20. The DS computing device of claim 1, wherein the user computing device includes a digital wallet of the driver, and wherein the at least one processor is further configured to transmit data representing the selected incentive to the user computing device causing a value corresponding to the selected incentive to be added to the digital wallet of the driver for future use by the driver.

* * * * *